US012749142B2

(12) United States Patent
Lin et al.

(10) Patent No.: US 12,749,142 B2
(45) Date of Patent: Sep. 29, 2026

(54) SOFT ROBOTIC SENSING AND PROPRIOCEPTION VIA CABLE AND MICROFLUIDIC TRANSMISSION

(71) Applicant: The Regents of the University of California, Oakland, CA (US)

(72) Inventors: Keng-Yu Lin, Santa Cruz, CA (US); Arturo Gamboa-Gonzalez, Santa Cruz, CA (US); Michael Wehner, Santa Cruz, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 714 days.

(21) Appl. No.: 17/993,361

(22) Filed: Nov. 23, 2022

(65) Prior Publication Data

US 2023/0158685 A1 May 25, 2023

Related U.S. Application Data

(60) Provisional application No. 63/291,229, filed on Dec. 17, 2021, provisional application No. 63/282,379, filed on Nov. 23, 2021.

(51) Int. Cl.

| | |
|---|---|
| ***G06V 10/22*** | (2022.01) |
| ***B25J 9/00*** | (2006.01) |
| ***B25J 9/16*** | (2006.01) |
| ***G06T 3/40*** | (2006.01) |
| ***G06V 10/141*** | (2022.01) |
| ***G06V 10/75*** | (2022.01) |

(52) U.S. Cl.

CPC ............... *G06T 3/40* (2013.01); *B25J 9/0015* (2013.01); *B25J 9/1697* (2013.01); *G06V 10/141* (2022.01); *G06V 10/751* (2022.01); *G06T 2207/20081* (2013.01); *G06T 2207/30204* (2013.01)

(58) Field of Classification Search

CPC ............. G06T 3/40; G06T 2207/20081; G06T 2207/30204; B25J 9/0015; B25J 9/1697; B25J 9/1694; B25J 19/023; B25J 13/085; G06V 10/141; G06V 10/751; G06V 10/225; G06V 10/25; G06V 10/44

See application file for complete search history.

(56) References Cited

U.S. PATENT DOCUMENTS

2022/0021798 A1* 1/2022 Tsuru .................... G06F 3/0346

OTHER PUBLICATIONS

Soter, Gabor, et al. "Skinflow: A soft robotic skin based on fluidic transmission." 2019 2nd IEEE International Conference on Soft Robotics (RoboSoft). IEEE, 2019.https://ieeexplore.ieee.org/abstract/document/8722744 (Year: 2019).*

(Continued)

*Primary Examiner* — Han Hoang

(74) *Attorney, Agent, or Firm* — GATES & COOPER LLP

(57) ABSTRACT

A method and system for sensing using a soft robotic system. The method and system uses displacement and/or deformation of elastomeric components, fibers, or liquids in the soil robotic system to change a visual state which is recordable in images by a digital camera. The displacement or deformation, or force applied to the soft robotic system is measured by analyzing the images using machine vision.

17 Claims, 12 Drawing Sheets

(56) References Cited

OTHER PUBLICATIONS

Scharff, Rob BN, et al. "Color-based sensing of bending deformation on soft robots." 2018 IEEE International Conference on Robotics and Automation (ICRA). IEEE, 2018.https://ieeexplore.ieee.org/abstract/document/8460521 (Year: 2018).*

Gerboni, Giada, et al. "Feedback control of soft robot actuators via commercial flex bend sensors." IEEE/ASME Transactions on Mechatronics 22.4 (2017): 1881-1888.https://ieeexplore.ieee.org/abstract/document/7914755 (Year: 2017).*

Cloney, R.A., et al., "Chromatophore Organs, Reflector Cells, Iridocytes and Leucophores in Cephalopods1", American Zoologist, 1983, pp. 581-592, vol. 23, No. 3.

Zeng, S., et al., "Bio-inspired sensitive and reversible mechanochromisms via strain-dependent cracks and folds", Nature Communications, 2016, pp. 1-9, vol. 7, No. 11802.

Florey, E., "Ultrastructure and Function of Cephalopod Chromatophores", American Zoologist, May 1969, pp. 429-442, vol. 9, No. 2.

Giordano, G., et al., "A Perspective on Cephalopods Mimicry and Bioinspired Technologies toward Proprioceptive Autonomous Soft Robots", Adv. Mater. Technol., 2021, pp. 1-25, vol. 6, No. 2100437.

Rossiter, J., et al., "Biomimetic chromatophores for camouflage and soft active surfaces", Bioinspiration & Biomimetics, Bioinspir. Biomim., 2012, pp. 1-11, vol. 7, No. 036009.

Williams, T.L., et al., "Dynamic pigmentary and structural coloration within cephalopod chromatophore organs", Nature Communications, 2019, pp. 1-15.

* cited by examiner

B

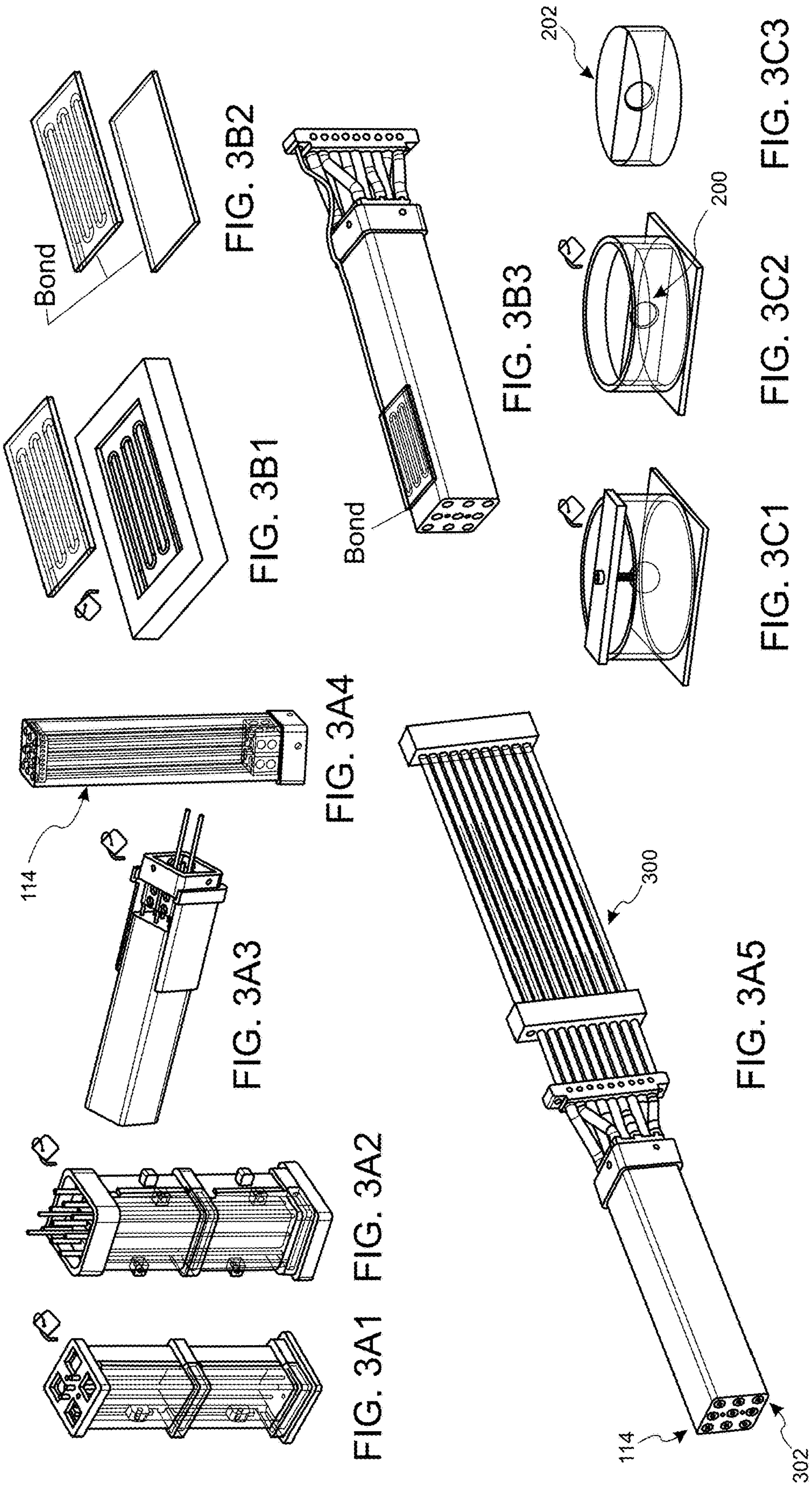
FIG. 3A1
FIG. 3A2
FIG. 3A3
FIG. 3A4
FIG. 3A5
FIG. 3B1
FIG. 3B2
FIG. 3B3
FIG. 3C1
FIG. 3C2
FIG. 3C3

150
146
148
144
147
M
Bend. 1
Bend. 2
Elong.
Twist
Displacement (Px.)
Bend Angle (degree)
Elongation (mm)
Twist Angle (degree)
F1
F2
F3
F4
F5
F6
F7
F8
F9
158, 124
154
155
159
152
113
176
178

SOFT ROBOTIC SENSING AND PROPRIOCEPTION VIA CABLE AND MICROFLUIDIC TRANSMISSION

CROSS REFERENCE TO RELATED APPLICATIONS

This application claims the benefit under 35 U.S.C. Section 119(e) of co-pending and commonly-assigned U.S. provisional patent application Ser. No. 63/282,379 filed Nov. 23, 2021 and U.S. provisional patent application Ser. No. 63/291,229 filed Dec. 17, 2021, by Keng-Yu Lin, Arturo Gamboa-Gonzalez, and Michael Wehner, entitled "SOFT ROBOTIC SENSING AND PROPRIOCEPTION VIA CABLE AND MICROFLUIDIC TRANSMISSION," client reference 2022-822, which applications are incorporated by reference herein.

BACKGROUND OF THE INVENTION

1. Field of the Invention

The present invention relates to methods and systems for sensing forces (e.g., applied to a soft robotic system).

2. Description of Related Art

Over the past decade, the emerging field of soft robotics has shown increasing potential to dramatically expand the capabilities of the field of robotics. Currently, however, most demonstrations have been limited to precisely that, potential. For soft robotics to emerge as a truly useful technology and become widely used in real-world application, advances are required in actuation, controls, fabrication and system design, and integration with larger rigid systems. Also critically important is development of novel sensor technologies, able to quickly provide robust state information, both as individual sensors and as integrated sensing systems. Soft robots hold the potential for unprecedented levels of state awareness and perception of the surrounding environment impossible with traditional rigid-linked robots. This innate ability to yield to the environment and to sense and learn from that interaction is one of the biggest potential advantages of soft robots. By embracing this ability to interact, soft robots hold the potential to fundamentally change human-robot-interaction, and usher in the era of Robots Among Us that has been promised for decades. To achieve this leap forward in state awareness and embodied intelligence, a rethinking of soft sensing is necessary.

Many technologies have been presented to achieve myriad sensing modes in soft robots. Soft sensors (sensors composed of compliant materials, gels, liquids, or a combination of these housed inside a soft robotics component) have been developed using conductive grease [1], capacitive liquid [2], resistive ionic gels [3], waveguides [4], and many demonstrations with liquid metals [5-7], primarily focusing on a Eutectic of Gallium and Indium (EGaIn) [8]. These many sensor technologies can measure changes in length [9], bending [10], pressure [11], even temperature in the distal end of a soft finger [12], and several mixed-mode sensing models [2], including an extremely compelling sensor from Park et al. [13], able to sense two modes of stretch and pressure, all in one sensor. Other sensing techniques used in soft robotics have involved adhering traditional bend sensors to a soft actuator [14], embedded magnets and hall effect sensors [15], and optical methods including the SOFTcell project by Bajcsy and Fearing [16] in which tactile response was determined through optical analysis of a deformed membrane, and video tracking of markers adhered to or embedded in soft components [17].

While these studies present compelling sensors, further sensor development is necessary particularly in utilizing a suite of sensors to increase overall state awareness. In both traditional and soft robotics many have studied proprioceptive sensor systems, robot skin, and bioinspired sensing/proprioception. Thorough discussion of these broad fields can be found in several reviews of various subspecialties [18-22]. The value of multi-sensor systems to perceive different proprioceptive or exteroceptive phenomena is widely appreciated. However, as the number of sensors increases, the computation, data acquisition, and signal processing loads dramatically increase. Each sensor requires a dedicated channel to a data acquisition system or an analog to digital converter, and requires signal processing and computation. A sensor-skin with a grid of ten-by-ten sensors would be of relatively modest requirement for many applications. Using discrete nodes, this would require one hundred dedicated sensors. Multiplexing by separating signals into ten horizontal and ten vertical sensors reduces the load to twenty separate sensors, still a considerable burden for a single sensor-skin device. What is needed, then, are improved methods for tracking motion and sensing of soft robotic systems. The present disclosure satisfies this need.

SUMMARY OF THE INVENTION

Current sensor technologies to sense pressure, force, or various modes of displacement in robotics are largely electrical (resistive or capacitive). Thus, each sensor requires a dedicated analog-input to a controller (e.g., for ten sensors, one needs ten analog inputs). Illustrative techniques described herein use displacement and deformation of a sensor (e.g., elastomeric components, fibers, and liquids) to change a state (e.g., visual state) which is recordable by a digital camera. Robust, low cost digital cameras can record and transmit to a computer/controller megapixels of information at 30 hertz, for example. The method and system is able to harness existing machine-vision technology to dramatically broaden sensing bandwidth in the fields of robotics and soft robotics.

Example embodiments include, but are not limited to, the following.

1. A sensor system, comprising:
- a material;
- one or more sensors attached to the material, each of the sensors comprising a chamber containing a marker;
- a digital imager (e.g., camera) positioned for capturing a series of digital images of the markers as a function of time;
- an image processor for image processing the one or more images to detect:
- one or more changes in the marker resulting from one or more motions of the chamber in response to one or more forces applied to the material, and
- from the changes, a pressure or one or more displacement modes of the material in response to the one or more forces, the displacement modes comprising at least one of a bending mode, an elongation mode, or a twist mode.

2. The sensor system of clam 1, wherein:
- the chamber comprises a channel containing a cable or fluid capable of moving along the channel in response to the one or more motions, and the marker comprises a colored portion of the cable or the fluid.

3. The sensor system of example 2, wherein the changes consist essentially of a linear displacement of the colored portion along a coordinate axis.

4. The sensor system of example 3, further comprising a display assembly guiding movement of the markers in along the axis in a two dimensional plane imaged by the digital imager to form the images.

5. The sensor system of example 1, wherein the chamber contains the marker comprising a fluid and the changes consist essentially of a size of the marker in response to the motions comprising an expansion or contraction of the chamber.

6. The sensor system of example 1, further comprising a display assembly comprising the markers, wherein the display assembly outside a region of the material deforming in response to the one or more forces, such that the image processor tracks the changes even when the region is outside a field of view of the digital imagers.

7. The sensor system of example 1, further comprising a display assembly comprising the markers and a lighting system, wherein the lighting system controls lighting conditions for the capturing of the images so as to enhance identification of the markers in the images during the image processing.

8. The sensor system of example 1, further comprising a network or array of the sensors (e.g., between 5 and 100 sensors), each of the sensors comprising the chamber transmitting the one or more of the motions, or one or more components of the motions, to the markers. In one or more examples, the imager is a single camera or single array of the digital imagers capturing the images each comprising all of the markers.

9. The sensor system of example 8, wherein the image processor assigns each of a plurality of arrangements of the markers, or arrangements of the changes, to a different one of the displacement modes or combination of the displacement modes.

10. The sensor system of example 9, wherein:

the chambers each comprise a channel comprising a first end and a second end, the first ends are distributed in three dimensions throughout a volume of the material deforming in response to the forces, and the second ends containing the markers are arranged in a two dimensional plane imaged in the one or more images by the digital camera.

11. The sensor system of example 10, wherein the image processor:

associates each of the markers with locations of the first ends in the material;

determines the linear displacements of each of the markers; and compares the linear displacements of each of the markers, taking into account the locations of the first ends associated with the each of the markers, so as to detect the displacement mode.

12. The sensor system of example 11, wherein the sensors comprise fibers, cables, or fluid moving in the channels, the first ends are distributed in array, and the markers are configured in a display assembly, so that for the displacement mode comprising:

the bending mode having a center of curvature:

a first set of the markers, attached to the first ends in a first row of array closest to the center of curvature, have the linear displacement in an opposite direction in the one or more images, as compared to a second set of the markers attached to the second ends in a second row of the array furthest from the center of curvature.

the elongation mode: all the markers have the linear displacement in the same direction in the one or more images, the twist mode about a central twist axis, a third set of the markers, attached to the first ends at corners of the array furthest from the twist axis, have the linear displacement that is larger in the one or more images as compared to a fourth set of the markers attached to the first ends closer to the twist axis.

14. The sensor system of example 1, further comprising:

a computer comprising one or more processors including the image processor; one or more memories; and one or more programs stored in the one or more memories, wherein the one or more programs executed by the one or more image processors execute the image processing using a machine vision algorithm or machine learning.

15. The sensor system of example 1, wherein:

the marker comprises a colored cable inserted in the chamber comprising a casing, wherein the casing is attached to the material so that the cable is free to slide inside the casing in response to the displacement modes changing a shape of the casing.

16. The sensor system of example 1, wherein the chamber comprises a microfluidic channel comprising a colored fluid comprising the marker and the digital imager records displacement of the colored fluid in response to the force or pressure.

17. The sensor system of example 1, wherein the chamber comprises a channel comprising a compressible sensing part connected to a flexible incompressible transmission part passing through a display assembly, so that when the force is applied to the sensing part through the material, the channel is compressed, reducing a volume of the sensor part and forcing the marker into the transmission part in the display assembly.

18. The sensor system of example 1, wherein the chamber is embedded in or mounted on a surface of the material.

19. The sensor system of example 1, further comprising:

a display assembly comprising a window forming a boundary around each of the markers, the boundary delimiting an extent of an image frame for each of the series of images being processed by the image processing, wherein, for each image frame, the image processing:

obtains the image comprising image data;

crops the image frame to include only the a portion of the image within the boundary;

converts the image data to gray scale to accentuate differences in light and dark colors and to eliminate possible noise from reflection;

scales up every pixel value within the image frame to further accentuate the difference between a white background behind the marker;

detects a line edge of each of the markers using an edge detector algorithm;

returns at least one end point pixel of each of the line edges using a probability algorithm;

uses the end point pixel of each of the line edges to calculate the change comprising a displacement of the marker between successive ones of the image frames.

20. The sensor system of example 1, further comprising a tool comprising the material, wherein the image processor:

detects, from the changes, the pressure or the one or more displacement modes of the component in response to the one or more forces, and outputs a measure of the one or more displacement modes as proprioceptive feedback to a robotic system controlling the tool.

21. In one embodiment, the system and method senses displacement modes including bending, elongation, and twist using machine vision and encased cables. In another embodiment, the system and method senses pressure and force on a surface using machine vision of a fluid-filled tube and displacement of the enclosed fluid. In yet a further embodiment, the system and method senses force and pressure on a surface using machine vision to observe shape change of one or more liquid or elastomeric dots inside an elastomer.

BRIEF DESCRIPTION OF THE DRAWINGS

Referring now to the drawings in which like reference numbers represent corresponding parts throughout:

FIG. 1A. Elastomeric finger containing fiber-based deformation sensors and microfluidic pressure sensor. Array of nine fibers independently sense local deformation. Fiber sensor data allows interpretation of overall finger state, including bending, elongation, and twist. FIG. 1B. Illustration of the elastomeric finger with fiber and fluidic sensors routed through the finger to a display assembly, where sensor positions are read by a digital camera. FIG. 1C. Fiber based displacement sensors. Still photos of finger (top) and fiber states in Display assembly (bottom). Note, fiber displacement between relaxed and bent states. FIG. 1D. Integrated microfluidic pressure sensor. Channel filled with colored liquid senses overall pressure inside elastomeric finger. FIG. 1E. Surface-Mount pressure sensor. In order to sense contact locally on the elastomeric finger, a sensor containing a fluidic channel is adhered to the region of interest. Tubing routes the fluid back through the finger to the display assembly. FIG. 1F. Cephalopod-Chromatophore inspired liquid pressure cells. Pressure on an elastomer deflects internal liquid cells. Deformation causes cells to change shape from spherical to disk shape, changing disk diameter.

FIG. 2A. Mechanics of materials in elongation, bending, and twist. FIG. 2B. Traditional vs soft sensors. Traditional (top), each sensor requires separate electronics and support. Bottom, multiple fiber sensors all routed back to display assembly. One camera records all sensors. One actuator is indicated in blue. Two additional actuators are indicated in red. FIG. 2C. CAD of assembly with the first (blue) actuator and two additional (red) actuators. Note, Camera records display assembly, not soft actuators for reduced complexity motion capture of many sensors at once.

FIGS. 3A-3C. Fabrication. FIG. 3A. Elastomeric finger containing fiber-based displacement sensor and integrated fluid pressure sensors. FIGS. 3A1-A3. An elastomeric finger is fabricated in three mold steps, containing channels for the nine fiber sensors and an integrated fluid pressure sensor. Molds are shown in gray. FIG. 3A4. Finished elastomeric finger, transparent representation to illustrate internal vasculature. FIG. 3A5. A finger is instrumented with fibers and integrated with the display assembly. FIG. 3B. Surface mount liquid pressure sensor is molded (FIG. 3B1), bonded to a base layer (FIG. 3B2), then bonded to an elastomeric finger, and infilled with colored water (FIG. 3B3). FIG. 3C. Chromatophore cell is molded into an elastomeric substrate and infilled with colored water (FIG. 3C1), then sealed with elastomer (FIG. 3C2) yielding a final sensor (FIG. 3C3).

FIG. 4A-4E fiber-based displacement sensors, FIGS. 4F-4I fluid-based pressure sensors. FIG. 4A. Fiber sensor configuration. FIG. 4B. Bend test setup. Elastomeric finger mounted horizontally, pulled from neutral to deformed (bent) state. FIG. 4C. Elongation. Finger mounted vertically, top-end pulled vertically. FIG. 4D. Fibers in the display assembly. Left neutral state, right when deformed (shown in bend direction 2). FIG. 4E. Finger mounted horizontally, twisted along its axis (shown in two views). FIG. 4F. Integrated fluidic pressure sensor undergoing compression. FIG. 4G. Surface-mount fluidic pressure sensor undergoing compression. FIG. 4H. Chromatophore inspired pressure sensor undergoing compression. FIG. 4I. Chromatophore sensor deflecting under pressure.

FIG. 5A. Bending direction 1. FIG. 5B. Bending direction 2. FIG. 5C. Elongation. FIG. 5D. Twisting. Legend for all graphs, Fiber 1-9 shown in the upper right (near subfigure FIG. 5C).

FIG. 6A. Integrated microfluidic sensor. An elastomeric finger is shown under an externally applied load. The graph shows displacement of fluid in display assembly (red line in inset still from video) vs force applied on an elastomeric finger with an embedded sensor. FIG. 6B. Surface-mount microfluidic pressure sensor. The graph shows displacement of fluid in display assembly vs force applied directly to the surface-mount sensor. FIG. 6C. Chromatophore inspired sensor. The graph shows the diameter of a fluid cell vs externally applied load.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

Disclosed herein are methods and systems for measuring a force by capturing images of the deformations of a sensor and processing the images.

FIRST EXAMPLE

Sensor System

Figures 1A, 1B, 1C, 1D, 1E, 1F:
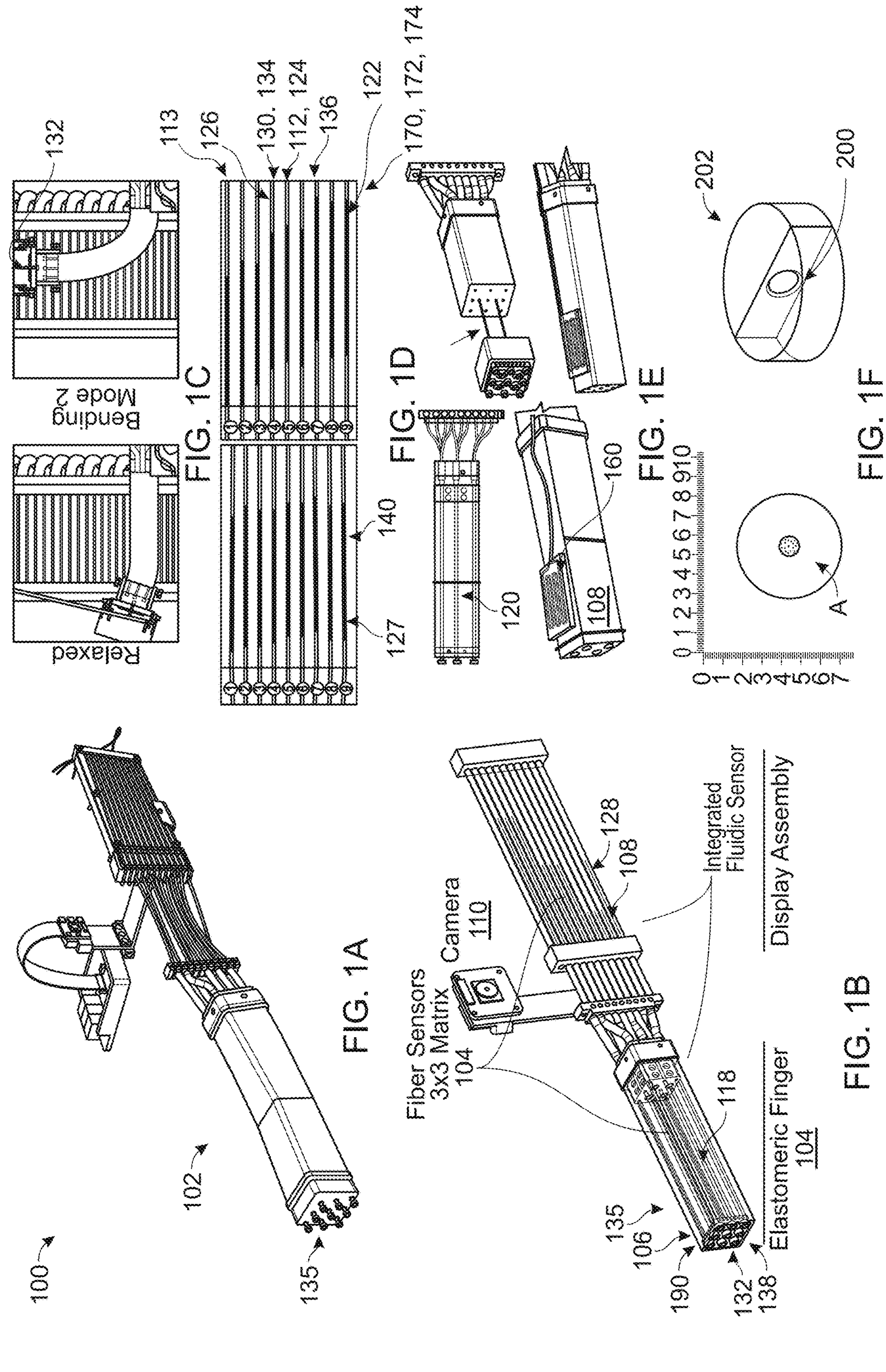
FIGS. 1A-1F. Soft sensors.

FIGS. 1A-1F illustrate a system comprising a digital camera recording markers from fiber-based deformation sensors and microfluidic pressure sensors coupled to an elastomeric finger-like structure. FIGS. 1A, 1B and 1D illustrate the elastomeric finger comprises nine fiber-based displacement sensors and one integrated microfluidic pressure sensor, FIG. 1E illustrates an example wherein the elastomeric finger is coupled a surface-mounted microfluidic pressure sensor. These are all monitored with a single digital camera and simultaneous analysis of these sensors allows determination of the state of the finger.

The fiber-based deformation sensor illustrated in FIGS. 1A-1C comprises a 3×3 matrix of fiber-based displacement sensors into the elastomeric finger. Each displacement sensor is composed of two main parts: fiber and tube. The fiber is a flexible but inextensible/incompressible nylon fiber. The tube is a flexible elastomeric void built into the bulk matrix of the finger. Fibers are fixed at the distal end of the finger and routed through tubes along the length of the finger and out to a display assembly (FIG. 1B). A short length (marker) of each fiber inside the display assembly is painted black. This contrasts with the white background allowing a digital camera to record the relative motion of the marker. When the elastomeric finger is distorted (bent, twisted, stretched), each tube changes shape and is stretched or compressed based on the overall mechanics of the mode of distortion. The fiber (free to slide along the length of the tube) slides within the display assembly, where the marker position and motion are recorded by a digital camera. In contrast to a Bowden cable assembly, which transmits force in many bicycle handbrakes, the passive sensor of the first example is distorted based on external actuation and used to sense displacement (the reverse of Bowden cables). Multiple cable-based sensors are embedded along the dorsal, ventral, and medial surfaces of the soft robotic sensor (3×3 grid at the end of the finger in FIG. 1A, 1B). Comparing relative motion between this grid of sensors allows differentiation between bending, stretching, and twist.

FIG. 1C illustrates the system's ability to quantify elongation along and twist about a longitudinal axis, and bending about the two orthogonal axes perpendicular to the longitudinal axis. FIG. 1D and FIG. 1E illustrate microfluidic sensors quantifying overall pressure via an integrated microfluidic sensor configuration (FIG. 1D) or local contact pressure via a surface-mounted microfluidic sensor configuration (FIG. 1E). These sensors (specifically designed to be used in groups) can be designed into soft robotic actuators, and leverage the framework provided from beam theory and classical mechanics of materials to sense the state of each actuated unit.

FIG. 1F illustrates a Cephalopod chromatophore-inspired color-cell pressure sensor that detects changes in local pressure through the deformation of colored liquid cells. Chromatophores have been widely studied for decades [27-29], and in recent years have become the inspiration for biomimicry and biomimetic work by the soft robotics community [30] using bulk deformation of a matrix to modulate appearance and spell out a word [31] or disrupting part of a surface using dielectric elastomers [32]. In this work, however, we flip the concept, using the color cell as a passive pressure sensor to estimate externally applied force, not as an active device, mechanically distorted to modulate appearance.

The sensor can be used individually or in groups to synergistically leverage the concepts from beam theory and mechanics of materials to infer system state from a strategically located system of sensors. A system comprising a soft robot comprising a properly configured array of these deformation and pressure sensors can provide state awareness far beyond that of individual sensors.

SECOND EXAMPLE

Deformation Modes of the Sensor According to the First Example

Figure 2A:
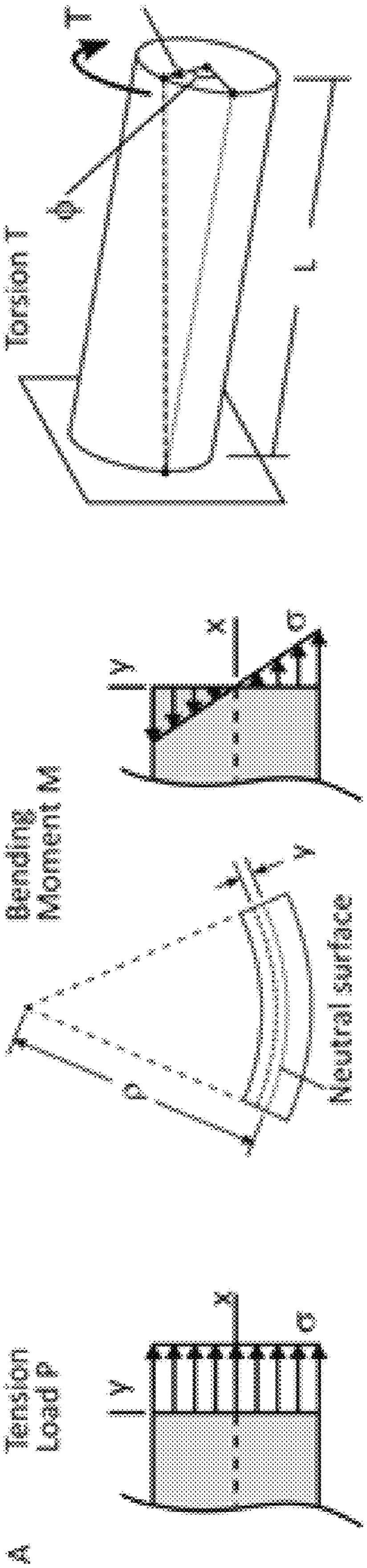
FIGS. 2A-2C. Fiber sensors, underlying concepts.

Euler-Bernoulli beam theory and classical mechanics of materials describe that beams experience stress and tension/compression throughout their cross-sections based on the mode of the applied loading (bending, tension/compression, twist, combined loading) [33]. FIG. 2A illustrate some primary beam deformation modes (FIG. 2A) (see [23] for more details). For a detailed analysis of beam theory or mechanics of materials, see [33-36].

For simple elongation, deformation is uniform across the cross-section, and proportional to the load applied (FIG. 2A). Deformation follows the equation $$\delta = \frac{PL}{AE} \quad 1)$$

Where δ is total displacement, P is applied load, L is total beam length, A is cross-section area, and E is Young's Modulus.

In bending, material closer to the center of curvature (smaller bend radius) experiences compression, material farther from the center of curvature (larger bend radius) experiences tension, and material along the neutral axis experiences neither tension nor compression. Within the linear elastic range, stress from bending (FIG. 2A) follows the equation $$\sigma_x = -\frac{My}{I} \quad 2)$$

where $\sigma_x$ is tensile or compressive stress, M is applied bending moment, y is the distance from the neutral surface (positive toward the center of curvature), and I is the second moment of inertia. The negative sign indicates compression toward the center of bending. Strain follows the equation $$\epsilon_x = -\frac{y}{\rho} \quad 3)$$

where $\epsilon_x$ is the strain in the beam axis, y is the distance from the neutral surface (positive toward the center of curvature), and ρ is the radius of curvature of the bent beam. The negative indicates shortening toward the center of curvature.

Shearing stress due to torsion (FIG. 2A) follows the equation $$\tau = \frac{T\rho}{J} \quad 4)$$

Where $\tau$ is shear stress, T is applied torque, $\rho$ is distance from the axis of rotation, and J is polar moment of inertia. The angle of twist follows the equation $$\phi = \frac{TL}{JG} \quad 5)$$

where $\phi$ is the total twist of the beam, L is beam length, J is the polar moment of inertia, and G is the shear modulus. We can find the change in length of a line (linear initially, helical after twist) parallel to the axis of the beam, a distance r from the twist axis. Initially of length L, the line becomes a helix after the beam twists by an angle $\phi$, about its central axis. The helix (former line, now helix) length is found from the formula $$L_{helix}=\sqrt{L^2+(\phi r)^2} \quad 6)$$

where $L_{helix}$ is the length of the helix, $\phi$ is the angle of twist found above, L is the beam length, and r is the distance from twist axis (see 23 for derivation). Thus, the change in length of a fiber parallel to the longitudinal axis is found to be:

$$\Delta L=L_{helix}-L \quad 7)$$

where $\Delta L$ is the change in length. With L and $\phi$ constant for any given beam and loading condition, we see that $L_{helix}$ increases as r increases. Thus, the farther an element is from the axis of rotation, the more it will increase in length when experiencing a twist. Thus fibers in the corners of a square cross-section will experience more displacement than fibers at the center of the square faces, and a fiber at the center of the square face will not elongate at all.

While these formulae hold for beams within the linear elastic region, the principles (while not necessarily the magnitudes) remain true in the large deformation regime. See [23] for details on the mechanics of materials described here, further figures on bending modes, and sign conventions [33]).

Figure 2B:
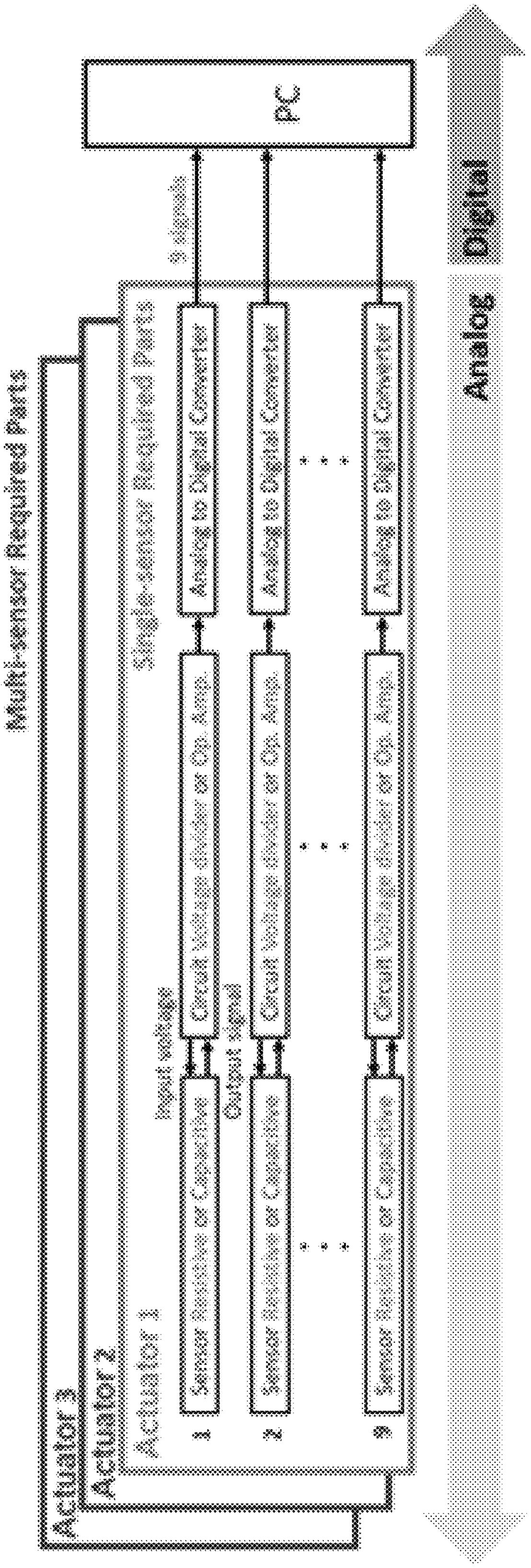
Figure 2C:
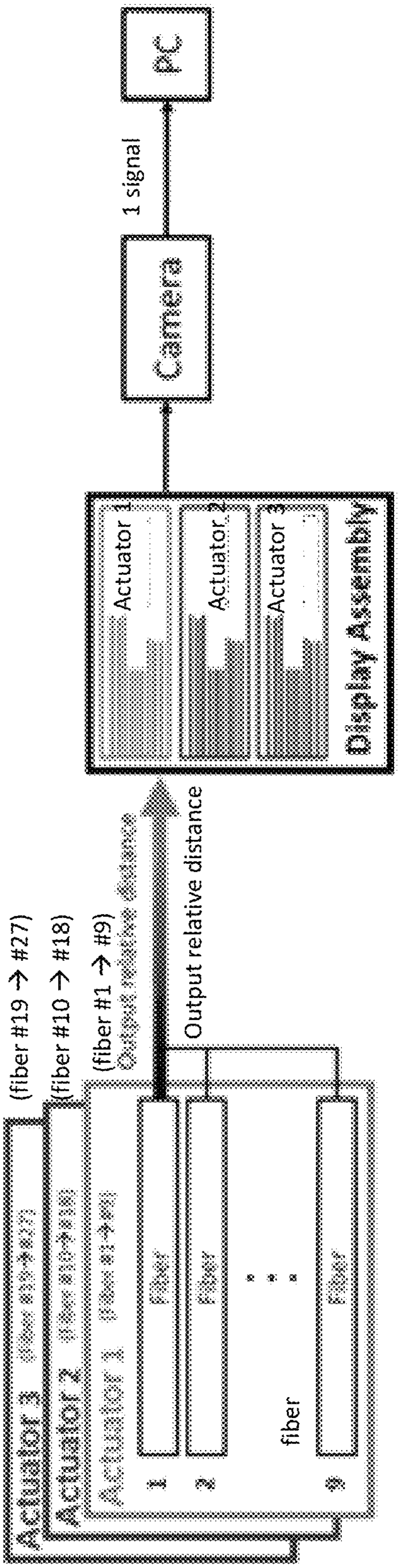

While each fiber sensor provides local deformation information, significantly more information can be obtained from groups of the devices integrated at scale without undue hardware requirements. FIG. 2B (top) illustrates traditional sensors require individual hardware for each sensor. Fiber sensors according to embodiments of the present invention, on the other hand, require only the passive fiber components, and a single camera for all fibers (as illustrated in FIG. 2B bottom). Then a single signal can be sent to the PC for video processing. Because video data consists of black markers moving horizontally across a white background, processing complexity is greatly reduced. For example, selecting fiber sensors in the lower right and upper left corners of the finger (1 & 9 in front-view, FIG. 2C):

When the finger is bent upwards, 9 will indicate compression, but 1 will indicate tension.

In elongation or twist, both will indicate tension. However, fibers 6 and 4 will indicate tension equal to 1 and 9 in extension, but less in twist.

FIG. 3C illustrates expansion of this example to the range of extension, bending, and twist scenarios, wherein a 3×3 matrix of fiber sensors can be configured across the cross-section of the finger. The combination of displacements allows interpretation of the deformation mode of the overall finger. For example, if the top three sensors are in compression, the middle three show no deformation, and the bottom three show tension, it can be inferred that the finger is being bent upwards. Only primary deformation modes are presented here. Mixed-mode deformations (combinations such as bend and twist) can also be measured. Offline marker tracking and characterization of these sensors in the deformation modes discussed above, as well as real-time marker tracking, could also be implemented as a path toward real-time control of soft robot actuators.

Both microfluidic methods transmit to the same display assembly used to record fiber position, thus a single digital camera can capture data from fiber-based deformation sensors as well as microfluidic pressure sensors. The presented configuration records eleven sensors (nine fiber, one integrated microfluidic, and one surface mount microfluidic) captured by one digital camera, as that was sufficient for this proof of concept. Minimizing scale could greatly increase the number of discrete sensors possible with one camera.

THIRD EXAMPLE

Design and Fabrication a. Fiber-Based Deformation Sensor

Similar in concept to many soft robots, a square column-shaped soft sensor (elastomeric finger) is fabricated using multiple molding steps. FIG. 3A illustrates the fabrication with a detailed description in [23]. The assembly is fabricated using three molding steps and a final integration step.

Mold 1 (first molding step). Three plastic bars (diameter 0.9 mm) were used to create the center cable chamber and two microfluidic chambers. The matrix material of the finger was a readily available elastomer, Ecoflex 00-30 (Smooth-On, Inc. Macungie, PA, USA) in molds printed from a 3D Printer (Form 3, Formlabs, Somerville, MA, USA).

Mold 2 (second molding step). Retaining the center plastic bar in the mold, the two other plastic bars were demolded. The silicon tube (inner diameter 0.5 mm, outer diameter 1 mm) was used to connect the microfluidic chambers on the top holes and extend the bottom holes. Then, the top carrier was attached to the center plastic bar and aligned with the other eight plastic bars into the second mold. The top carrier embedded in the soft sensor provides a surface to fix the cables.

Mold 3 (third molding step). The soft sensor was demolded from the second mold, keeping all the plastic bars and two silicon tubes inside the sensor, and then aligned them to the base holder. After alignment, the sensor was secured into the final mold and the finger was connected to the solid base holder once cured.

Integration. The high-strength fiber cables (Monofilament nylon thread, diameter 0.5 mm) were inserted into the soft sensor chambers and fixed using screws on the top carrier. The colored liquid was then injected into the microfluidic chambers.

For illustrative purposes, the fabrication of the deformation sensor is described along with the integrated microfluidic pressure sensor because the device should be fabricated concurrently into one integrated unit. However, the deformation sensor can also be fabricated without the integrated microfluidic pressure sensor. Moreover, the integrated pressure sensor in the finger motif can also be designed into most actuator systems that use a matrix of molded elastomer.

b. Microfluidic Pressure Sensor

While this integrated sensor described above provides useful overall pressure of the soft finger, a surface-mount microfluidic pressure sensor was also developed to expand sensing capabilities (FIG. 3B). Similar in form to several existing surface-mount sensors, our technique uses the displacement of liquid rather than change in resistance in an ionogel [24,25] or liquid metal [26]. This surface-mount pressure sensor is similar in concept to a microfluidic embodiment of the Skinflow work by Hauser, Rossiter, et al. [38]. This surface mount sensor can be fabricated from elastomers of various durometers in different thicknesses to modulate sensitivity, and it can be mounted (singly or in groups) at various locations along the elastomeric finger or other actuators. Fluid displacement data can be interpreted in the same camera frame as the fiber-based actuator described above, thus expanding the sensing modes possible with this overall vision-based system.

c. Color Cell Pressure Sensor

Chromatophore cells filled with pigment appear as small dark dots. To change perceived color, radial muscle fibers stretch the chromatophore cell from roughly spherical to a wide-thin disk shape of the same volume. Thus, when viewed from an axis normal to the disk-plane, the appearance changes from a small, dark dot in a near-transparent matrix to a larger colored disk. An array of these chromatophores in various colors allows the animal to present a variety of appearances. While cephalopods use their chromatophore cells to actively modulate their appearance (camouflage), the present invention uses passive cells as sensors. Fabricated into an elastomeric matrix, external pressure causes these spherical cells to deform into disks in a plane normal to the applied force. When viewed from an axis normal to the disk plane, the diameter of the disk increases with applied force.

FOURTH EXAMPLE

Vision Algorithms for Measuring the Deformations of the Sensors According to First Example An algorithm was designed to process two different possible image stream inputs: a real-time camera stream, or a previously recorded video. Real-time processing was implemented using a video stream from a Raspberry Pi Camera Module 2, with the constraint of the camera being aligned such that the painted filaments are approximately parallel to the horizontal axis. The videos recorded on a separate device were filmed with the same constraint. To address alignment issues across multiple runs, boundaries were digitally positioned around each of the channels with the filaments in the camera frame (current frame for live stream, first frame for recorded videos) before beginning the algorithm.

The OpenCV Python library for image processing was used to facilitate detection in each frame. Each frame was first cropped to include only the boundaries and then converted to be in grayscale to accentuate differences in light and dark colors and to eliminate possible noise from reflection. Every pixel value within the frame was then scaled up to further accentuate the difference between the white background and the black filaments. The Canny edge detector algorithm was then used to determine the edges of the filaments, and the Hough Lines Probability algorithm was used to return the start and endpoint pixel coordinates of each line edge. The algorithm was then allowed to iterate over each detected line, and the endpoint furthest to the right within each boundary was recorded as a pixel location in a CSV. Further details are provided in Appendix B.

FIFTH EXAMPLE

Figure 4A:
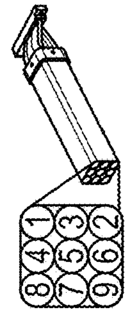
FIGS. 4A-4I. Test fixtures.
Figure 4B:
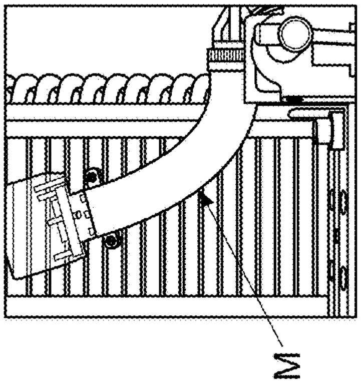
Figure 4C:
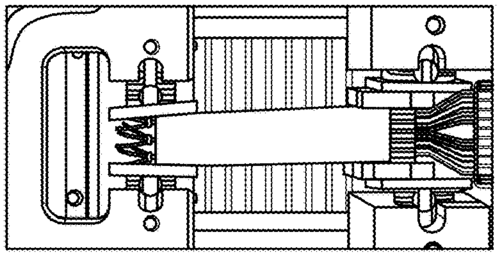
Figure 4D:
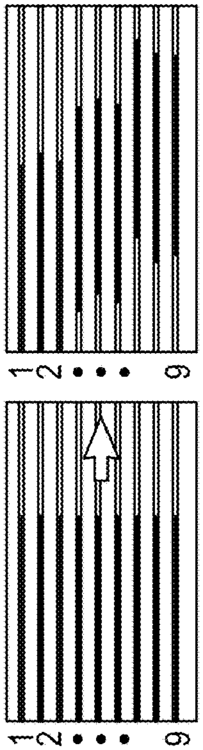
Figure 4E:
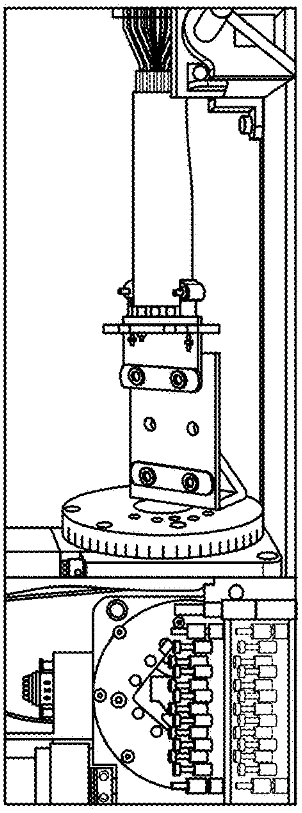
Figure 4F:
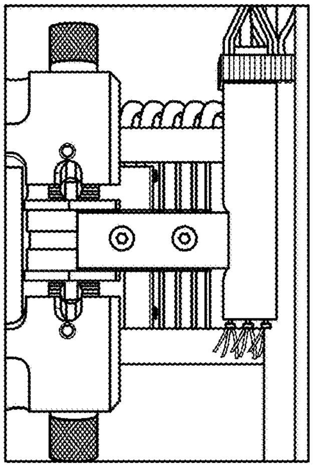
Figure 4G:
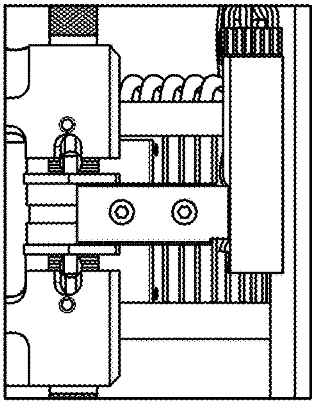
Figure 4H:
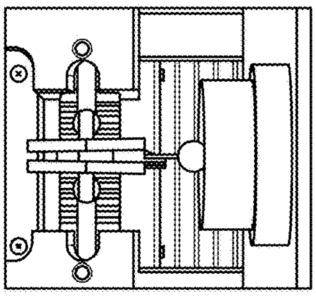
Figure 4I:
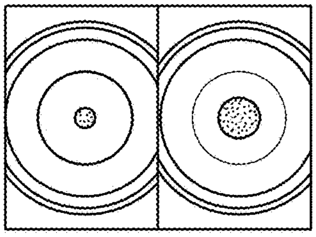

Characterization of the Sensor According to the First Example a. Measurement Setup The performance of the elastomeric finger containing fiber-based displacement sensors and fluid-based pressure sensor was evaluated in each actuation mode individually, although many applications may require mixed-mode sensing (elongation and twist combined, or bending along a non-primary axis) using the real-time vision algorithms described above. For the fiber-based sensor, separate characterization fixtures were employed for each mode of evaluation (bending, elongation, twist). As shown in FIG. 4A, each fiber sensor was mounted to an Instron 5943 tensile tester (Instron Co. Norwood, MA). The same apparatus was used for bending 1 and bending 2, offset by 90° as illustrated in FIG. 4A-4E. Integrated microfluidic pressure sensor characterization (FIG. 4F) and surface mount microfluidic pressure sensor characterization (FIG. 4G) were performed on the same fixture, and chromatophore-inspired sensor characterization (FIG. 4H, I) was performed on a separate fixture. Each test was performed four times to monitor repeatability.

b. Results

Figures 5A, 5B, 5C, 5D:
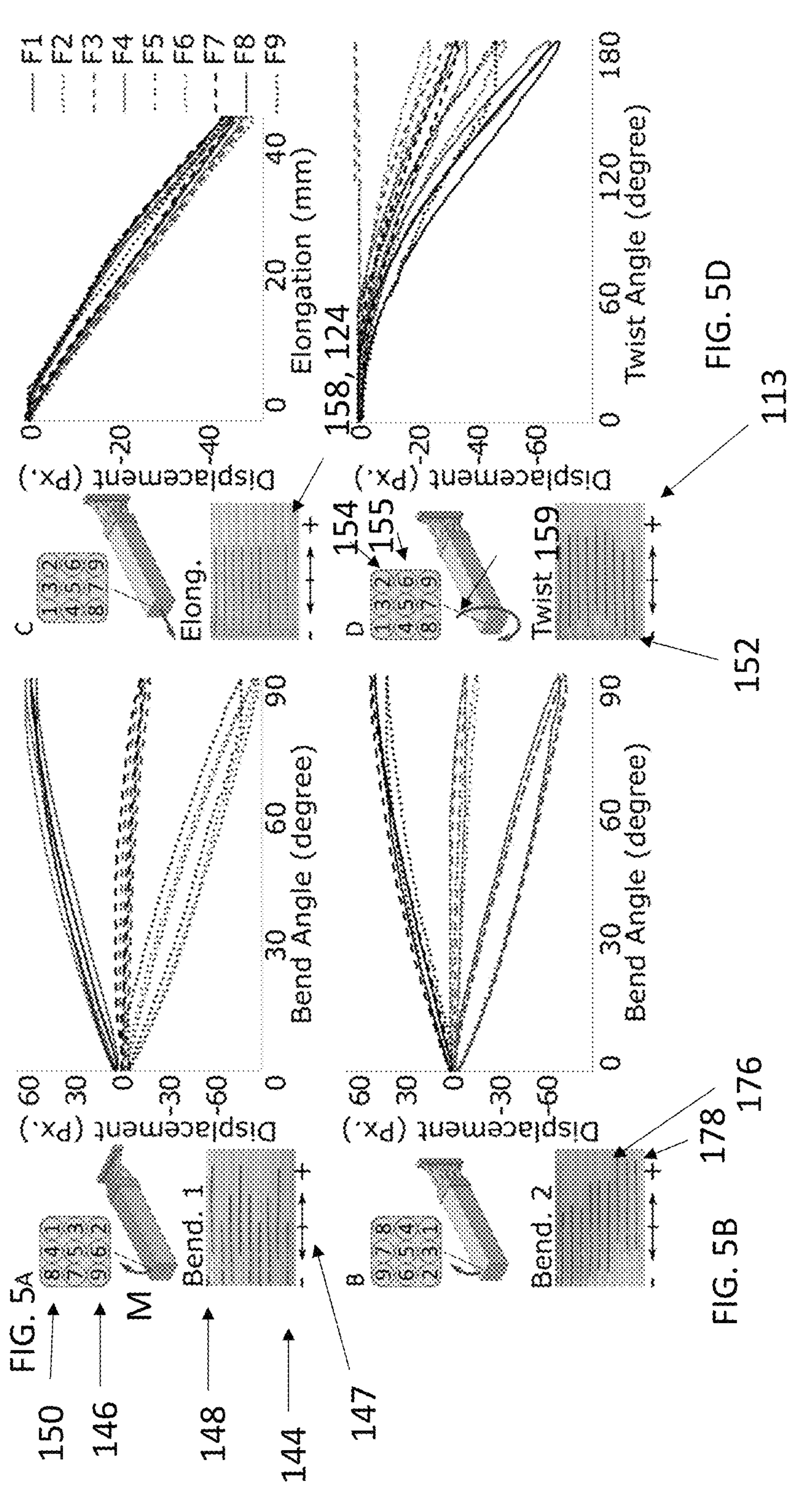
FIGS. 5A-5D. Results, fiber sensor marker displacement (pixels). Fiber configuration is shown in the upper left of each subfigure. Sample images of marker displacements are shown in the lower left of each subfigure (1 top . . . 9 bottom).

Data was divided into fiber-based deformation sensors, (estimating soft finger displacement) and fluid-based pressure sensors (microfluidic and color cells). Fiber-based sensor characterization investigates displacement of a 3×3 grid of fibers as described in the Methods section. FIG. 5 presents fiber responses to displacement in two modes of bending (offset by 90°), extension, and twist. Finger orientation and resulting fiber locations within the finger are shown in the illustration to the left of each graph. To achieve two modes of bending, the finger was rotated inside the mounting fixture 90° between Bending 1 and Bending 2, yielding a different fiber orientation. Fiber orientation for elongation and twist is also shown, but because these displacements are along the longitudinal axis, orientation does not affect results.

(i) Fiber-Based Deformation Sensor

As the elastomeric finger undergoes displacement in the described mode, material distorts locally, consistent with theory from classical mechanics of materials ([23]). Fibers, attached at the distal end of the elastomeric finger are free to move inside their respective tubes, thus they do not elongate or compress. Rather they move along their tube and back through the display assembly. Thus, when the finger undergoes Bending direction 1 (FIG. 5A), the top portion of the finger undergoes compression, the bottom undergoes tension, and the midplane sees little tension or compression. With the fiber configuration shown in FIG. 5A, bending 1 should cause the uppermost fibers to move farther into the display assembly (positive direction). The lower fibers should move out of the display assembly (negative direction) and fibers in the midplane should move very little at all, as verified by the data in the graph in FIG. 5A. Solid lines (fiber 1, 4, 8) are positive, dotted lines (fibers 2, 6, 9) are negative, and dashed lines (fiber 3, 5, 7) moved little at all. Due to the test setup (distal end of finger pulled upward and allowed to move laterally) some tension in the finger caused the midplane to stretch slightly, causing slight negative values in dashed lines.

When the finger was rotated 90° and Bending direction 2 was investigated (FIG. 5B), similar results were observed. In this configuration, black lines (fibers 7, 8, 9) were those along the top edge of the finger, where the finger was in compression. These fibers moved into the display assembly (positive displacement). Similarly, red lines (fibers 1, 2, 3) were pulled out of the assembly, but green lines (fibers 4, 5, 6) were little affected.

Tests in elongation (FIG. 5C) were also as expected. As the elastomeric finger was elongated, all fibers moved out of the display assembly, and recorded as negative displacement. Experiments in twist (FIG. 5D) also showed results consistent with classical mechanics of materials. Fibers at the corners, farthest radially from the central axis (fibers 1, 2, 8, 9) exhibited the most deformation, pulling the fibers out of the display assembly for negative displacement. Fibers along the flat of each surface (fibers 3, 4, 6, 7), closer to the neutral axis, exhibited less deformation, and recorded as less-negative displacement. Finally, fiber 5 at the neutral axis exhibited almost no displacement at all.

(ii) Hysteresis

The hysteresis loop (wherein the actuation path does not overlay with release path, but instead creates a loop in bend angle, elongation, or twist vs fiber displacement) was also studied. If the hysteresis were due to the internal properties of the fiber sensors, it would not negate the value of the sensing system, but it should be addressed. Analysis of the still frames from the motion capture videos indicated that the actuation and release paths of the elastomeric finger do not trace out a similar path. In other words, the shape of the elastomeric finger is different at a given angle in the actuation (0°→90°) path than in the release (90°→0°) path. Thus, it would be expected that the fibers sense different finger geometry based on the path.

(iii) Microfluidic Pressure Sensors

Figure 6A:
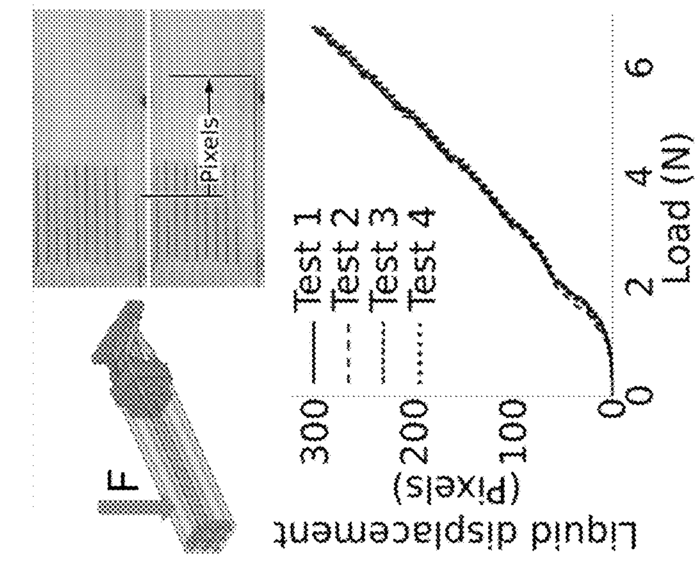
FIGS. 6A-6C. Results, microfluidic pressure sensors.
Figure 6B:
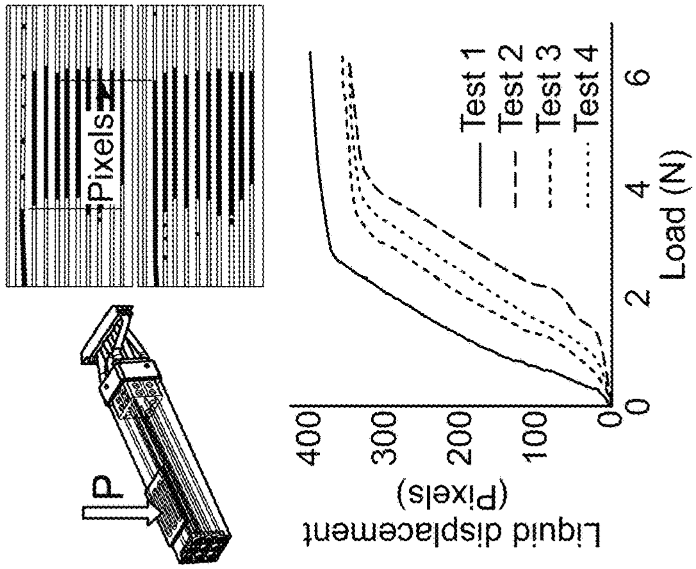

The elastomeric finger was configured with an integrated microfluidic pressure sensor along its entire length. Consisting of a liquid-filled microfluidic channel, this sensor was intended to sense the overall pressure state in the elastomeric finger. Thus, repeatability and range are highly desirable; however maximizing sensitivity (ability to perceive a light touch) was not required for this sensor. FIG. 6A shows a very repeatable and linear response to forces up to eight Newton, with no sign of signal saturation (change in geometry precludes perception of increased applied load) over four trials. FIG. 6B shows the sensor response of a surface-mounted pressure sensor over four trials. Such a sensor would be attached to the surface of the elastomeric finger to sense a desired (or undesired) contact at a particular location on the finger surface. Thus, for such a sensor, linearity and maximum force before saturation are not primary concerns. Rather, for this sensor, the ability to detect contact is of primary interest. While this sensor is shown to saturate with an applied force below four Newton, saturation is of little concern once contact is detected.

Figure 6C:
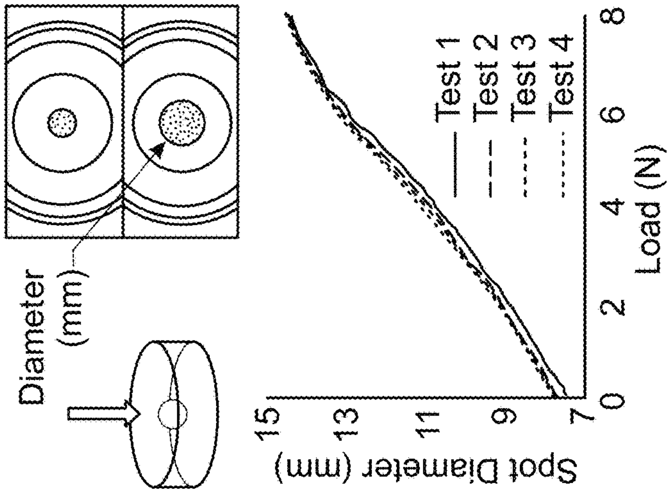

FIG. 6C presents the behavior of the chromatophore-inspired fluidic pressure sensor. At applied loads, up to eight Newton, the radial expansion of the liquid cell is relatively repeatable and very linear. The technique has been demonstrated here using one liquid cell, but the technique could be expanded to any number of cells at varying depths, colors, and volumes to achieve a multitude of responses to pressure.

SIXTH EXAMPLE

Robotic System and Network of Sensors Coupled to a Single Camera

An example elastomeric finger described herein comprises nine fiber sensors to determine its pose, and two fluidic sensors to determine overall and local pressure states. By configuring fibers in a 3×3 matrix, classical Mechanics of Materials (See [23]) was used to determine pose during states of bending in both primary planes, twist about the primary axis, and elongation along the primary axis. While this example illustrated using a finger designed specifically to illustrate adherence to classical mechanics of materials theory, this state estimation could be applied to a range of soft actuators and soft robots in general. The technique can also be implemented in actuator design similar to the soft finger described in [15,39] with a roughly square cross-section. These fiber and fluidic sensors could be used in many soft robots with actuators having rectangular, round, or trapezoidal cross-sections, requiring sensors to be placed at based on beam theory for that cross-section. With their innate under-actuation and deformability, defining the pose of a soft robot with reasonable accuracy requires far more sensors than do traditional robots. One can readily imagine a soft robot requiring nine sensors (3×3 matrix) for each actuator to estimate its pose. Thus, using a convention technology, a three-fingered gripper would require 27 sensors, a simple quadruped would require 36, and a more complex robot would require many more. The circuitry and wiring required for this many discrete electrical sensors would quickly become burdensome. With the method and system according to embodiments presented herein, passive sensors are all routed back to one central display assembly and recorded by one digital camera. While the examples shows the number of sensors (11 sensors) in the display assembly was chosen as it was the number required to characterize the soft finger (nine deformation and two pressure sensors), other sensor numbers can be used. Any upgrading (to increase sampling frequency or resolution) could be contained to the camera system, while upgrading dozens of electrical sensors (as in conventional systems) would also be a comparatively sizeable task. As illustrated herein, many fibers could be routed back to one remote display assembly, where a single digital camera can track the motion of all markers in a controlled environment, optimally lit for contrast and marker tracking.

Example Hardware Environment

Figure 7:
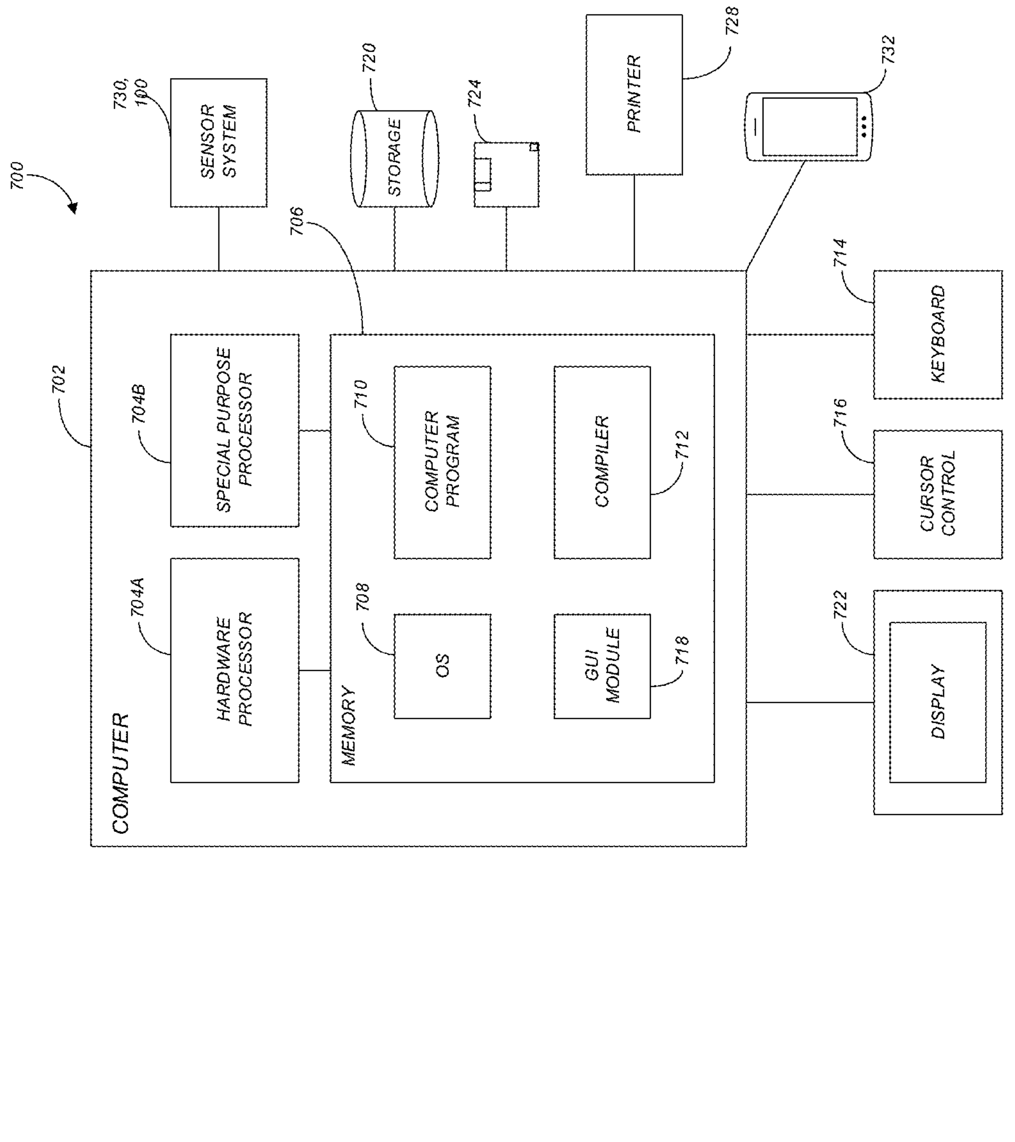
FIG. 7. Example hardware environment for performing the image processing.

FIG. 7 is an exemplary hardware and software environment 700 (referred to as a computer-implemented system and/or computer-implemented method) used to implement one or more embodiments of the invention. The hardware and software environment includes a computer 702 and may include peripherals. Computer 702 may be a user/client computer, server computer, or may be a database computer. The computer 702 comprises a hardware processor 704A and/or a special purpose hardware processor 704B (hereinafter alternatively collectively referred to as processor 704) and a memory 706, such as random access memory (RAM). The computer 702 may be coupled to, and/or integrated with, other devices, including input/output (I/O) devices such as a keyboard 714, a cursor control device 716 (e.g., a mouse, a pointing device, pen and tablet, touch screen, multi-touch device, etc.) and a printer 728. In one or more embodiments, computer 702 may be coupled to, or may comprise, a portable or media viewing/listening device 732 (e.g., an MP3 player, IPOD, NOOK, portable digital video player, cellular device, personal digital assistant, etc.). In yet another embodiment, the computer 702 may comprise a multi-touch device, mobile phone, gaming system, internet enabled television, television set top box, or other internet enabled device executing on various platforms and operating systems.

In one embodiment, the computer 702 operates by the hardware processor 704A performing instructions defined by the computer program 710 under control of an operating system 708. The computer program 710 and/or the operating system 708 may be stored in the memory 706 and may interface with the user and/or other devices to accept input and commands and, based on such input and commands and the instructions defined by the computer program 710 and operating system 708, to provide output and results.

Output/results may be presented on the display 722 or provided to another device for presentation or further processing or action. In one embodiment, the display 722 comprises a liquid crystal display (LCD) having a plurality of separately addressable liquid crystals. Alternatively, the display 722 may comprise a light emitting diode (LED) display having clusters of red, green and blue diodes driven together to form full-color pixels. Each liquid crystal or pixel of the display 722 changes to an opaque or translucent state to form a part of the image on the display in response to the data or information generated by the processor 704 from the application of the instructions of the computer program 710 and/or operating system 708 to the input and commands. The image may be provided through a graphical user interface (GUI) module 718. Although the GUI module 718 is depicted as a separate module, the instructions performing the GUI functions can be resident or distributed in the operating system 708, the computer program 710, or implemented with special purpose memory and processors.

In one or more embodiments, the display 722 is integrated with/into the computer 702 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 702 according to the computer program 710 instructions may be implemented in a special purpose processor 704B. In this embodiment, some or all of the computer program 710 instructions may be implemented via firmware instructions stored in a read only memory (ROM), a programmable read only memory (PROM) or flash memory within the special purpose processor 704B or in memory 706. The special purpose processor 704B may also be hardwired through circuit design to perform some or all of the operations to implement the present invention. Further, the special purpose processor 704B may be a hybrid processor, which includes dedicated circuitry for performing a subset of functions, and other circuits for performing more general functions such as responding to computer program 710 instructions. In one embodiment, the special purpose processor 704B is an application specific integrated circuit (ASIC).

The computer 702 may also implement a compiler 712 that allows an application or computer program 710 written in a programming language such as C, C++, Assembly, SQL, PYTHON, PROLOG, MATLAB, RUBY, RAILS, HASKELL, or other language to be translated into processor 704 readable code. Alternatively, the compiler 712 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 710 accesses and manipulates data accepted from I/O devices and stored in the memory 706 of the computer 702 using the relationships and logic that were generated using the compiler 712.

The computer 702 also optionally comprises an external communication device such as a modem, satellite link, Ethernet card, or other device for accepting input from, and providing output to, other computers 702.

In one embodiment, instructions implementing the operating system 708, the computer program 710, and the compiler 712 are tangibly embodied in a non-transitory computer-readable medium, e.g., data storage device 720, which could include one or more fixed or removable data storage devices, such as a zip drive, floppy disc drive 724, hard drive, CD-ROM drive, tape drive, etc. Further, the operating system 708 and the computer program 710 are comprised of computer program 710 instructions which, when accessed, read and executed by the computer 702, cause the computer 702 to perform the steps necessary to implement and/or use the present invention or to load the program of instructions into a memory 706, thus creating a special purpose data structure causing the computer 702 to operate as a specially programmed computer executing the method steps described herein. Computer program 710 and/or operating instructions may also be tangibly embodied in memory 706 and/or sensor system 730, 100, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 702.

Figure 8:
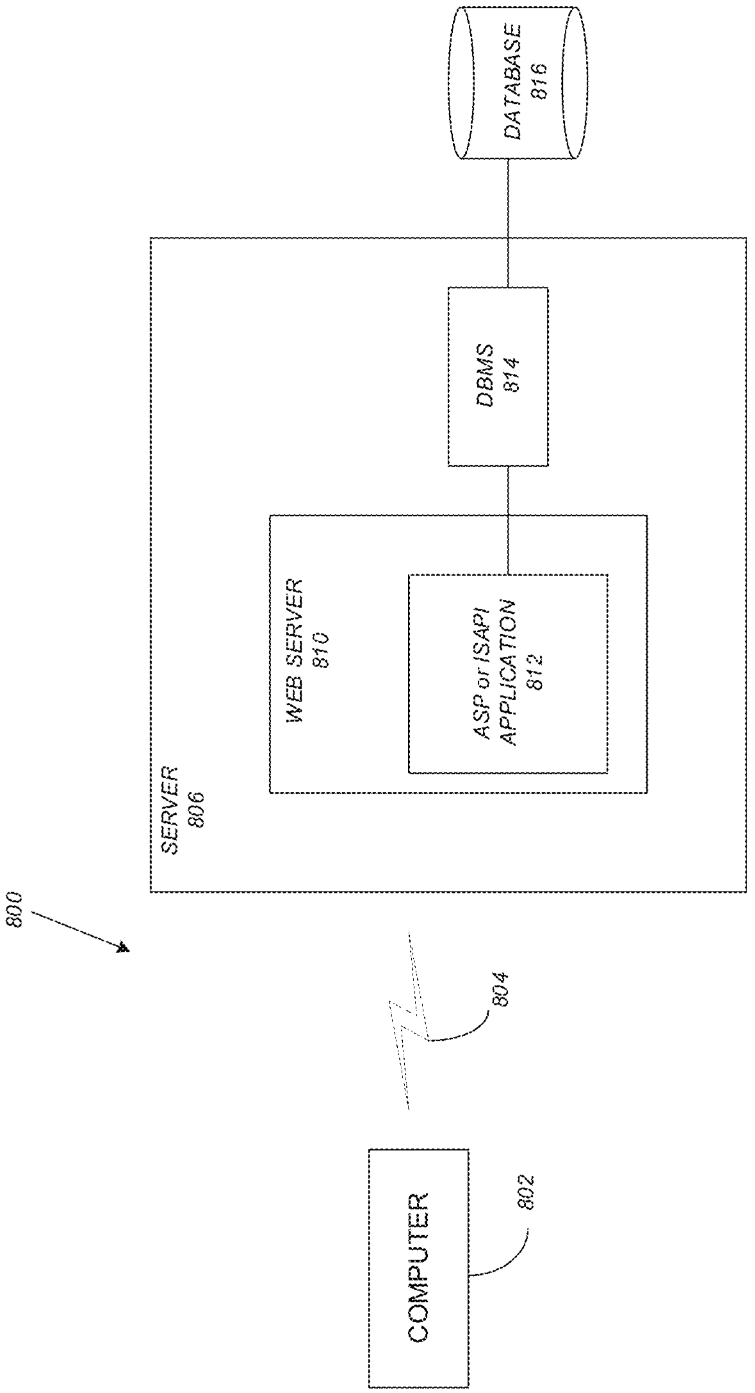
FIG. 8. Example cloud/Network environment for performing the image processing.

FIG. 8 schematically illustrates a typical distributed/cloud-based computer system 800 using a network 804 to connect client computers 802 to server computers 806. A typical combination of resources may include a network 804 comprising the Internet, LANs (local area networks), WANs (wide area networks), SNA (systems network architecture) networks, or the like, clients 802 that are personal computers or workstations (as set forth in FIG. 7), and servers 806 that are personal computers, workstations, minicomputers, or mainframes (as set forth in FIG. 7). However, it may be noted that different networks such as a cellular network (e.g., GSM [global system for mobile communications] or otherwise), a satellite based network, or any other type of network may be used to connect clients 802 and servers 806 in accordance with embodiments of the invention.

A network 804 such as the Internet connects clients 802 to server computers 806. Network 804 may utilize ethernet, coaxial cable, wireless communications, radio frequency (RF), etc. to connect and provide the communication between clients 802 and servers 806. Further, in a cloud-based computing system, resources (e.g., storage, processors, applications, memory, infrastructure, etc.) in clients 802 and server computers 806 may be shared by clients 802, server computers 806, and users across one or more networks. Resources may be shared by multiple users and can be dynamically reallocated per demand. In this regard, cloud computing may be referred to as a model for enabling access to a shared pool of configurable computing resources.

Clients 802 may execute a client application or web browser and communicate with server computers 806 executing web servers 810. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 802 may be downloaded from server computer 806 to client computers 802 and installed as a plug-in or ACTIVEX control of a web browser. Accordingly, clients 802 may utilize ACTIVEX components/component object model (COM) or distributed COM (DCOM) components to provide a user interface on a display of client 802. The web server 810 is typically a program such as MICROSOFT'S INTERNET INFORMATION SERVER.

Web server 810 may host an Active Server Page (ASP) or Internet Server Application Programming Interface (ISAPI) application 812, which may be executing scripts. The scripts invoke objects that execute business logic (referred to as business objects). The business objects then manipulate data in database 816 through a database management system (DBMS) 814. Alternatively, database 816 may be part of, or connected directly to, client 802 instead of communicating/obtaining the information from database 816 across network 804. When a developer encapsulates the business functionality into objects, the system may be referred to as a component object model (COM) system. Accordingly, the scripts executing on web server 810 (and/or application 812) invoke COM objects that implement the business logic. Further, server 806 may utilize MICROSOFT'S TRANSACTION SERVER (MTS) to access required data stored in database 816 via an interface such as ADO (Active Data Objects), OLE DB (Object Linking and Embedding DataBase), or ODBC (Open DataBase Connectivity).

Generally, these components 800-816 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 802 and 806 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 802 and 806. Embodiments of the invention are implemented as a software application on a client 802 or server computer 806. Further, as described above, the client 802 or server computer 806 may comprise a thin client device or a portable device that has a multi-touch-based display.

In one or more examples, the one or more processors, memories, and/or computer executable instructions are specially designed, configured or programmed for performing machine learning or machine vision. The computer program instructions may include a pattern matching component for pattern recognition or applying a machine learning model (e.g., for analyzing data or training data input from a data store to perform the machine vision). In one or more examples, the processors may comprise a logical circuit for performing pattern matching or recognition, or for applying a machine learning model for analyzing data or train data input from a memory/data store or other device (e.g., an image from a camera). Data store/memory may include a database. In some examples, the pattern matching model applied by the pattern matching logical circuit may be a machine learning model, such as a convolutional neural network, a logistic regression, a decision tree, or other machine learning model. In one or more examples, the logical circuit comprises a semantic segregation logical circuit, a natural language processing/image captioning logical circuit, and an image reconstruction logical circuit.

The computer can be an embedded computer or processor, for example.

Example Process Steps

Figure 9:
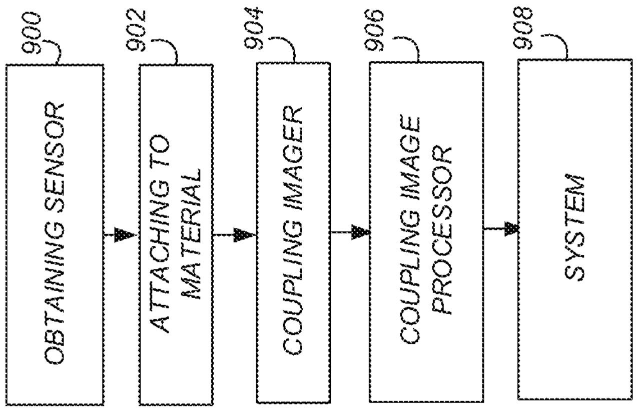
FIG. 9. Flowchart illustrating a method of making a system according to embodiments described herein.

FIG. 9 is a flowchart illustrating a method of making a sensor system.

Block 900 represents fabricating or obtaining one or more sensors each comprising a chamber containing a marker.

Block 902 represents attaching the one or more sensors to a material or a tool (e.g., finger, arm) comprising the material.

Block 904 represents positioning/coupling a digital imager (e.g., a digital camera, charge coupled device (CCD), focal plane array) for capturing a series of digital images of the markers as a function of time.

Block 906 represents connecting an image processor for image processing the one or more images. The image processor is configured to detect:

one or more changes in the marker resulting from one or more motions of the chamber in response to one or more forces applied to the material, and from the changes, a pressure or one or more displacement modes of the material in response to the one or more forces, the displacement modes comprising at least one of a bending mode, an elongation mode, or a twist mode.

Block 908 represents the end result, a sensor system. Embodiments include, but are not limited to, the following (referring also to FIGS. 1-8).

1. A sensor system 100, comprising:
   a material 102;
   one or more sensors 104 attached to the material 102, each of the sensors 104 comprising a chamber 106 containing a marker 108;
   a digital imager 110 positioned for capturing one or more (or a series of) digital images 113 of the markers 108 as a function of time;
   an image processor 700 for image processing the one or more images 113 to detect:
   one or more changes 112 in the marker 108 resulting from one or more motions of the chamber 106 in response to one or more forces F applied to the material 102, and
   from the changes 112, a pressure or one or more displacement modes of the material 102 in response to the one or more forces F, the displacement modes comprising at least one of a bending mode, an elongation mode, or a twist mode.
2. A proprioceptive sensor 100 for a soft robotic finger 190 or arm, comprising a microchannel system coupled to machine vision system that senses what's happening to the arm or finger 190 (e.g. whether the arm or finger is being compressed, elongated lengthwise or from one of the sides, or twisted, or bent, etc.) by analyzing images of the deformation of the arm or finger.
3. A sensor system 100, comprising:
   a marker 108 attached to a compliant member 114 in a soft robot;

a digital camera 110 positioned to capture a series of images 113 of the marker 108 as a function of time as the compliant member 114 is displaced or subjected to a force F or pressure P; and a computer 700 comprising one or more processors; one or more memories; and one or more programs stored in the one or more memories, wherein the one or more programs executed by the one or more processors execute a machine vision algorithm:

identifying a change 112 in the marker 108 from the recorded in the images 113; and measuring or quantifying, from the change 112, at least one of a displacement mode of the compliant member 114 or a pressure/force applied to the compliant member.

4. The sensor system 100 of example 1, wherein:

the chamber 106 comprises a channel 116 containing a cable 118 or fluid 120 capable of moving along the channel 116 in response to the one or more motions M, and the marker comprises a colored portion 122 of the cable or the fluid.

5. The sensor system of example 1 or 4, wherein the changes 112 consist essentially of a linear displacement 124 of the colored portion 122 along a coordinate axis 126.

6. The sensor system of any of the examples 1, 3, 4-5 further comprising a display assembly 128 guiding movement of the markers 108 in along the axis in a two dimensional plane 130 imaged by the digital imager 110 to form the images 113.

7. The sensor system of any of the examples 1 or 4-6, wherein the chamber 106 contains the marker 108 comprising a fluid 120 and the changes consist essentially of a size or area A of the marker 108 in response to the motions comprising an expansion or contraction of the chamber 106.

8. The sensor system of any of the examples 1, 3, 4-7, further comprising a display assembly 128 comprising the markers 108, wherein the display assembly 128 is outside a region 132 of the material 102 deforming in response to the one or more forces F, such that the image processor 700 tracks the changes 112 even when the region 132 is outside a field of view 134 of the digital imager 110.

9. The sensor system of any of the examples 1, 3, 4-8 further comprising a display assembly 128 comprising the markers 108 and a lighting system, wherein the lighting system controls lighting conditions for the capturing of the images 113 so as to enhance identification of the markers 108 in the images 113 during the image processing.

10. The sensor system of any of the examples 1-9, further comprising a network 135 or array of the sensors 104, each of the sensors 104 comprising the chamber 106 transmitting the one or more of the motions M, or one or more components of the motions, to the markers 108.

11. The sensor system of any of the examples 1 or 3-10, wherein the image processor 700 assigns each of a plurality of arrangements 136 of the changes (e.g., linear displacements) of all the markers 108 to a different one of the displacement modes or combination of the displacement modes.

12. The sensor system of any of the examples 1 or 4-11, wherein:

the chambers 106 each comprise a channel 116 comprising a first end 138 and a second end 140, the first ends 138 are distributed in three dimensions throughout a volume of the material 102 deforming in response to the forces F, and the second ends 140 containing/comprising the markers 108 are arranged in a two dimensional plane 130 imaged in the one or more images 113 by the digital camera 110.

13. The sensor system of example 12, wherein the image processor 700:

associates each of the markers 108 with locations of the first ends 138 in the material 102;

determines the linear displacements 124 of each of the markers 108; and compares the changes 112 (e.g., linear displacements 124) of each of the markers 108, taking into account the locations of the first ends 138 associated with the each of the markers 108, so as to detect the displacement mode.

14. The sensor system of any of the examples 10-13, wherein the sensors 104 comprise fibers, cables 118, or fluid 120 moving in the channels 116, the first ends 138 are distributed in array 142, and the markers 108 are configured in a display assembly 128, so that for the displacement mode comprising:

the bending mode having a center of curvature:

a first set 144 of the markers 108, attached to the first ends 138 in a first row 146 of array 142 closest to the center of curvature, have the linear displacement 124 in an opposite direction 147 in the one or more images 113, as compared to a second set 148 of the markers attached to the second ends 140 in a second row 150 of the array furthest from the center of curvature; and/or the elongation mode: all the markers 158 have the linear displacement 124 in the same direction in the one or more images 113, the twist mode about a central twist axis 159, a third set 152 of the markers 108, attached to the first ends at corners 154 of the array 142 furthest from the twist axis, have the linear displacement 124 that is larger in the one or more images 113 as compared to a fourth set 155 of the markers attached to the first ends 138 closer to the twist axis 159.

15. The sensor system of any of the examples 1 or 4-14, further comprising:

a computer 700 comprising one or more processors including the image processor; one or more memories; and one or more programs stored in the one or more memories, wherein the one or more programs executed by the one or more image processors execute the image processing using a machine vision algorithm or machine learning.

16. The sensor system 100 of any of the examples 1 or 4-15, wherein:

the marker 108 comprises a colored cable 300 inserted in the chamber 106 comprising a casing 302, wherein the casing 302 is attached to the material 102 so that the cable 118 is free to slide inside the casing 302 in response to the displacement modes changing a shape of the casing 302.

17. The sensor system of any of the examples 1 or 4-15, wherein the chamber 106 comprises a microfluidic channel 116 comprising a colored fluid 127 comprising the marker 108 and the digital imager 110 records displacement of the colored fluid 127 in response to the force F or pressure P.

18. The sensor system of any of the examples 1 or 3-15, wherein the chamber 106 comprises a channel 116 comprising a compressible sensing part connected to a flexible incompressible transmission part passing through a display assembly 128, so that when the force is applied to the sensing part through the material, the channel is compressed, reducing a volume of the sensor part and forcing the marker into the transmission part in the display assembly.
19. The sensor system of any of the examples 1-18, wherein the chamber 106 is embedded in or mounted on a surface 160 of the material.
20. The sensor system of any of the examples 1-19, further comprising:

a display assembly 128 comprising a window 170 forming a boundary 172 around each of the markers, the boundary delimiting an extent of an image frame 174 for each of the series of images being processed by the image processing, wherein, for each image frame, the image processing:

obtains the image comprising image data;

crops the image frame to include only the a portion of the image within the boundary;

converts the image data to gray scale to accentuate differences in light and dark colors and to eliminate possible noise from reflection;

scales up every pixel value within the image frame to further accentuate the difference between a white background behind the marker;

detects a line edge 176 of each of the markers using an edge detector algorithm;

returns at least one end point pixel 178 of each of the line edges using a probability algorithm;

uses the end point pixel of each of the line edges to calculate the change comprising a displacement of the marker between successive ones of the image frames.

21. The sensor system of any of the examples 1 or 4-20, further comprising a tool 190 comprising the material 102, wherein the image processor 700:

detects, from the changes 112, the pressure or the one or more displacement modes of the component in response to the one or more forces F, and outputs a measure of the one or more displacement modes as proprioceptive feedback to a robotic system controlling the tool.

22. The sensor system of any of the examples 1-21, wherein:

the marker comprises a plurality of colored cables 300 each inserted in a casing 302, wherein the casings 302 are attached to the compliant member so that one or more of the cables are free to slide inside their respective casing in response to the displacement modes changing a shape of the respective casings.

23. The sensor system of any of the example 3, wherein the soft robot further comprises a display assembly attached to the compliant member and the digital camera is positioned to capture the images of the cables moving in the display assembly.
24. The sensor system of any of any of the examples, wherein the displacement modes comprise elongation along and twist about a longitudinal axis, or bending about two orthogonal axes perpendicular to the longitudinal axis.
25. The sensor system of any of example 3, wherein the compliant member includes microfluidic channels comprising a colored liquid comprising the marker and the digital camera records displacement of the colored fluid in response to the force or pressure.
26. The sensor system of example 3, wherein the markers comprise liquid or elastomeric dots 200 and the machine vision algorithm identifies the change comprising a change in shape of the dots 200 in response to the force or pressure so as to quantify the pressure or the force.
27. The sensor system of any of the examples 1 or 3 or 22, wherein the markers comprise filaments.
28. The sensor system of any of the examples including a compliant member, wherein the compliant member comprises a finger or arm.
29. The sensor system of example 28, wherein the compliant member comprises an elastomer.
30. A vision-based method or system of sensing deformation and pressure in soft robots, including only passive components inside the soft robot.
31. A fiber-based deformation sensor wherein local material displacement in a soft robot is transmitted to a remote display assembly and tracked by a digital camera.
32. A fluidic sensor, wherein a pressure in a soft robot displaces liquid inside a microfluidic channel which is transmitted back to a display assembly for readout and analysis.
33. An integrated microfluidic pressure sensor, by which the overall pressure state inside the body of a soft robot is tracked.
34. A surface-mount pressure sensor to track contacts locally on the surface of a soft robot.
35. A color-cell pressure sensor 202, wherein the passive spherical color cell 200 is embedded in an elastomeric matrix. When an external force is applied to the elastomer, the color cell is compressed in the direction normal to the force, expanding it radially.
36. A multi-channel data acquisition device in the form of one or more CCD camera(s) coupled to a soft robotic system, wherein the CCD cameras are configured to record displacement in embedded liquid or fiber-based components inside an elastomeric finger-like structure. In one embodiment, the system is able to quantify elongation along and twist about a longitudinal axis, and bending about the two orthogonal axes perpendicular to the longitudinal axis. In another embodiment, the system is able to quantify contact pressure at various locations on the finger-like structure. The device may be used to detect mixed-mode perturbances (bending off axis or elongation and bending) as well as dynamic effects.
37. The system of any of the examples, wherein the sensor translates the deformation mode to linear displacement or size change of a marker.
38. FIG. 1D illustrates an integrated microfluidic pressure sensor embodiment, wherein microfluidic channels are embedded into the elastomeric finger to sense the overall pressure exerted on the finger. This sensor consists of a sensing part and a transmission part, both filled with colored liquid. The sensing part is compressible and embedded along the length of the square column-shaped elastomeric finger. The transmission part consists of a flexible, incompressible tube routed through the display assembly. When force is applied to the sensing part, the chamber is compressed, reducing the volume of the sensor part. This forces the incompressible colored liquid out of the sensing part, through the transmission part, and across a display tube in the display assembly.

39. FIG. 1E illustrates a surface-mount pressure sensor which can be bonded (singularly or in batches) to the surface of the finger or any similar elastomeric device. This pressure sensor can be installed at any location on a multitude of elastomeric actuators and robotic systems. Characterization data on one sensor to demonstrate its utility (not an exhaustive study of possible configuration or applications) is discussed in following sections.
40. A color cell pressure sensor wherein the color cell pressure sensor utilize active modulation for passive sensing. Spherical cells of colored liquid are embedded in an elastomeric substrate. When the substrate undergoes external pressure, local deformation causes the spherical cells to deform into a disk-like shape. Viewed from an axis normal to the disk plane, this causes the disks to appear larger than the original spheres. The applied force can then be determined from observation of a change in the diameter of the disk.
41. The system of any of the examples, comprising a network of sensors/markers (e.g., at least 10, or a number in a range of 5-20), comprising a single digital camera, CCD, or imaging sensor array for measuring the motion of the markers and the image processing of the images (each of the images containing all the markers) is used to determine the force(s).
42. A sensor outputting position and pressure data to a digital camera for real-time or offline data processing. A single camera can record and interpret data from many deformation and pressure sensors, providing a platform for state perception and embodied intelligence research. The camera does not record the elastomeric finger itself, but records instead the remotely located display assembly (FIG. 1A, 1B), where it tracks the motion of fiber-based displacement sensors and microfluidic pressure sensors.
43. The system of any of the examples, comprising a bus (e.g., a mechanical bus) comprising the sensors (e.g., chambers or channels) transmitting the motions to the markers in a display.

The method may further include coupling/integrating the sensor system 100 of any of the examples in a robotic system or robot.

Method of Operation

Figure 10:
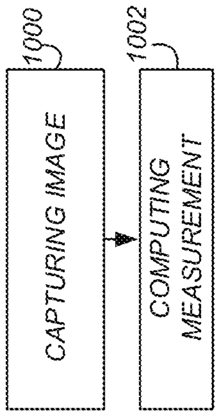
FIG. 10. Flowchart illustrating a method of using a sensor system according to embodiments described herein.

FIG. 10 illustrates a method for sensing a force (e.g., using a soft robotic system), comprising using displacement and/or deformation of a material (e.g., elastomeric components, fibers, or liquids in the soft robotic system) to change a state (e.g., visual state) which is recordable in images by a digital camera; and measuring the displacement or deformation by analyzing the images using image processing or machine vision, Block 1000 represents capturing, using a digital camera, one or more digital images of one or more changes in a sensor in response to application of a force to the sensor.

Block 1002 represents computing a measurement of the response from the changes captured in the one or more images.

Embodiments of the method include, but are not limited to, the following.

1. The method comprising sensing the response comprising displacement modes of a the sensor in a soft robotic system, including bending, elongation, and twist, using the machine vision and encased cables attached to the soft robotic system.
2. The method of any of the examples, further comprising sensing pressure and force on a surface of the soft robotic system using machine vision of a fluid-filled tube attached to the soft robotic system and displacement of the enclosed fluid in the tube.
3. The method of any of the examples, further comprising sensing force and pressure on a surface of the soft robotic system comprising an elastomer, using the machine vision to observe a shape change of one or more liquid or elastomeric dots inside the elastomer.
4. The method of any of the examples, wherein the computing comprises the machine vision algorithm.
5. The method of any of the examples, wherein the computing comprises measuring the changes in position coordinates of the sensor in the images in response to the force.
6. The method of any of the examples, wherein the sensor comprises one or more cables, the one or more changes comprise one or more changes in one or more positions of the one or more cables, and the measurement of the response comprises the measurement of one or more displacement modes of the sensor including at least one of a bending mode, an elongation mode, or a twist mode.
7. The method of any of the examples, performed using the system of any of the examples illustrated in the example of FIG. 9.

Advantages and Improvements

The field of robotics has long sought methods of perceiving various modes of displacement as well as methods of perceiving contact force/pressure with high resolution across surfaces (similar to nerves in skin). These needs are becoming amplified with the growth of the Co-Bot movement, in which robots are placed among humans in the workplace and daily life. Our techniques provide solutions for robust, low cost sensing using widely available digital cameras. Our method uses displacement of components (fibers inside channels, liquid inside tubes, and deformation of liquid cell) captured by digital camera to sense phenomena in the environment.

More specifically, the present disclosure describes an elastomeric finger with nine embedded fiber deformation sensors, one integrated pressure sensor, and one surface-mounted pressure sensor. The fiber sensors have been experimentally characterized in two orthogonal directions of bending, twist about the finger's primary axis, and extension. All modes of deformation followed the responses expected from by mechanics of materials and beam theory. The integrated microfluidic pressure sensor demonstrated a highly repeatable response to externally applied pressure with no saturation detected at 7N externally applied force. The surface-mounted pressure sensor (to sense contact locally) sensed much smaller applied forces (0.05-0.3N) but saturated when as little as 2N force was applied. As a contact sensor, early detection is more useful than high saturation levels. These results on a single elastomeric finger provide a foundation upon which a wide variety of sensorized actuators utilizing the present invention can be built (including actuators described in [39].

While the sensor designs presented here have value individually, a key advantage is that the sensors are fundamentally designed to be used in groups. Intended to be designed into a soft robot at the system level, a properly configured array of these deformation and pressure sensors can give state awareness far beyond that of individual sensors. Most sensors used in soft robots (and many sensors in general) vary in resistance or capacitance in response to a change in a physical parameter such as length, bend angle, or contact pressure. Each sensor requires wiring, electronic circuitry, and a dedicated input to a data acquisition system before the resulting signal is sent to a computer. Five sensors require five times the infrastructure. Embodiments described herein, on the other hand, use a digital camera to record the movement of markers on fiber sensors and colored liquid in microfluidic channels. Thus dozens of markers and fluid channels can be monitored almost as easily as one. Other camera-based soft robot state-estimation systems exist, but they primarily record the pose of the robot directly, thus requiring specific lighting conditions, unobstructed line-of-sight access to all parts of the robot.

Recording the sensor states rather than the elastomeric finger itself (as illustrated herein) presents several advantages:

No clear line of sight is needed. During typical robotic tasks, portions of a finger would often become obstructed when environmental objects or the robot itself come between the finger and the camera.

By remotely recording the display assembly, all aspects of recording (color, contrast, lighting) can be controlled to values optimum for marker tracking, impossible in real-world robotic applications.

By tracking only monochromatic markers moving in well-defined horizontal or vertical paths in a controlled environment (no unanticipated glare/obstructions), extremely simplified vision algorithms can be used, allowing much faster processing.

REFERENCES

The following references are incorporated by reference herein.

1. Muth, J. T.; Vogt, D. M.; Truby, R. L.; Mengüç, Y.; Kolesky, D. B.; Wood, R. J.; Lewis, J. A. Embedded 3D Printing of Strain Sensors within Highly Stretchable Elastomers. *Advanced Materials* 2014, 26, 6307-6312, doi:10.1002/adma.201400334.
2. Roberts, P.; Damian, D. D.; Shan, W.; Lu, T.; Majidi, C. Soft-Matter Capacitive Sensor for Measuring Shear and Pressure Deformation. In Proceedings of the 2013 IEEE International Conference on Robotics and Automation; May 2013; pp. 3529-3534.
3. Boivin, M.; Milutinović, D.; Wehner, M. Movement Error Based Control for a Firm Touch of a Soft Somatosensitive Actuator. In Proceedings of the 2019 American Control Conference (ACC); July 2019; pp. 7-12.
4. Zhao, H.; O'Brien, K.; Li, S.; Shepherd, R. Optoelectronically Innervated Soft Prosthetic Hand via Stretchable Optical Waveguides. *Science Robotics* 2016, 1, eaai7529, doi:10.1126/scirobotics.aai7529.
5. Cho, G.-S.; Park, Y.-J. Soft Gripper with EGaIn Soft Sensor for Detecting Grasp Status. *Applied Sciences* 2021, 11, 6957, doi:10.3390/app11156957.
6. Kim, T.; Lee, S.; Hong, T.; Shin, G.; Kim, T.; Park, Y.-L. Heterogeneous Sensing in a Multifunctional Soft Sensor for Human-Robot Interfaces. *Science Robotics* 2020, 5, eabc6878, doi:10.1126/scirobotics.abc6878.
7. Hammond, F. L.; Mengüç, Y.; Wood, R. J. Toward a Modular Soft Sensor-Embedded Glove for Human Hand Motion and Tactile Pressure Measurement. In Proceedings of the 2014 IEEE/RSJ International Conference on Intelligent Robots and Systems; September 2014; pp. 4000-4007.
8. Chossat, J.-B.; Park, Y.-L.; Wood, R. J.; Duchaine, V. A Soft Strain Sensor Based on Ionic and Metal Liquids. *IEEE Sensors Journal* 2013, 13, 3405-3414, doi:10.1109/JSEN.2013.2263797.
9. Daalkhaijav, U.; Yirmibesoglu, O. D.; Walker, S.; Mengüç, Y. Rheological Modification of Liquid Metal for Additive Manufacturing of Stretchable Electronics. *Advanced Materials Technologies* 2018, 3, 1700351, doi:10.1002/admt.201700351.
10. Truby, R. L.; Wehner, M.; Grosskopf, A. K.; Vogt, D. M.; Uzel, S. G.; Wood, R. J.; Lewis, J. A. Soft Somatosensitive Actuators via Embedded 3D Printing. *Advanced Materials* 2018, 30, 1706383.
11. Vogt, D.; Menguc, Y.; Park, Y.-L.; Wehner, M.; Kramer, R. K.; Majidi, C.; Jentoft, L. P.; Tenzer, Y.; Howe, R. D.; Wood, R. J. Progress in Soft, Flexible, and Stretchable Sensing Systems. In Proceedings of the Proceedings of the International Workshop on Research Frontiers in Electronics Skin Technology at ICRA; 2013; Vol. 13.
12. Truby, R. L. Designing Soft Robots as Robotic Materials. *Acc. Mater. Res.* 2021, 2, 854-857, doi:10.1021/accountsmr.1c00071.
13. Park, Y.-L.; Chen, B.-R.; Wood, R. J. Design and Fabrication of Soft Artificial Skin Using Embedded Microchannels and Liquid Conductors. *IEEE Sensors Journal* 2012, 12, 2711-2718, doi:10.1109/JSEN.2012.2200790.
14. Gerboni, G.; Diodato, A.; Ciuti, G.; Cianchetti, M.; Menciassi, A. Feedback Control of Soft Robot Actuators via Commercial Flex Bend Sensors. *IEEE/ASME Transactions on Mechatronics* 2017, 22, 1881-1888.
15. Fast Probabilistic 3-D Curvature Proprioception with a Magnetic Soft Sensor|IEEE Conference Publication-|IEEE Xplore Available online: https://ieeexplore.ieee.org/abstract/document/9551572?casa_token=PeqhRYVUnWwAAAAA:pzzoRF3McivXXhlOd56BhlouOZBsG9mZd8TqIldmzRxRRAZuQLN9CIVlOfbpp7r-4oekd3U2Yw (accessed on 27 Oct. 2021).
16. McInroe, B. W.; Chen, C. L.; Goldberg, K. Y.; Goldberg, K. Y.; Bajcsy, R.; Fearing, R. S. Towards a Soft Fingertip with Integrated Sensing and Actuation. In Proceedings of the 2018 IEEE/RSJ International Conference on Intelligent Robots and Systems (IROS); October 2018; pp. 6437-6444.
17. Li, D.; Dornadula, V.; Lin, K.; Wehner, M. Position Control for Soft Actuators, Next Steps toward Inherently Safe Interaction. *Electronics* 2021, 10, 1116, doi:10.3390/electronics10091116.
18. Tapia, J.; Knoop, E.; Mutný, M.; Otaduy, M. A.; Bächer, M. MakeSense: Automated Sensor Design for Proprioceptive Soft Robots. *Soft Robotics* 2020, 7, 332-345, doi:10.1089/soro.2018.0162.
19. Otero, T. F. Towards Artificial Proprioception from Artificial Muscles Constituted by Self-Sensing Multi-Step Electrochemical Macromolecular Motors. *Electrochimica Acta* 2021, 368, 137576, doi:10.1016/j.electacta.2020.137576.
20. Shih, B.; Shah, D.; Li, J.; Thuruthel, T. G.; Park, Y.-L.; Iida, F.; Bao, Z.; Kramer-Bottiglio, R.; Tolley, M. T. Electronic Skins and Machine Learning for Intelligent Soft Robots. *Science Robotics* 2020, 5, eaaz9239, doi:10.1126/scirobotics.aaz9239.

21. Holmes, P.; Full, R. J.; Koditschek, D.; Guckenheimer, J. The Dynamics of Legged Locomotion: Models, Analyses, and Challenges. *SIAM Rev.* 2006, 48, 207-304, doi:10.1137/S0036144504445133.
22. Dahiya, R. S.; Mittendorfer, P.; Valle, M.; Cheng, G.; Lumelsky, V. J. Directions Toward Effective Utilization of Tactile Skin: A Review. *IEEE Sensors Journal* 2013, 13, 4121-4138, doi:10.1109/JSEN.2013.2279056.
23. Appendix B and Appendix C in the priority applications U.S. provisional patent application Ser. No. 63/282,379 filed Nov. 23, 2021 and U.S. provisional patent application Ser. No. 63/291,229 filed Dec. 17, 2021, by Keng-Yu Lin, Arturo Gamboa-Gonzalez, and Michael Wehner, entitled "SOFT ROBOTIC SENSING AND PROPRIOCEPTION VIA CABLE AND MICROFLUIDIC TRANSMISSION."
24. Boivin, M.; Milutinović, D.; Wehner, M. Movement Error Based Control for a Firm Touch of a Soft Somatosensitive Actuator. In Proceedings of the 2019 American Control Conference (ACC); July 2019; pp. 7-12.
25. Truby, R. L.; Wehner, M.; Grosskopf, A. K.; Vogt, D. M.; Uzel, S. G.; Wood, R. J.; Lewis, J. A. Soft Somatosensitive Actuators via Embedded 3D Printing. *Advanced Materials* 2018, 30, 1706383.
26. Park, Y.-L.; Chen, B.-R.; Wood, R. J. Design and Fabrication of Soft Artificial Skin Using Embedded Microchannels and Liquid Conductors. *IEEE Sensors Journal* 2012, 12, 2711-2718, doi:10.1109/JSEN.2012.2200790.
27. FLOREY, E. Ultrastructure and Function of Cephalopod Chromatophores. *American Zoologist* 1969, 9, 429-442, doi:10.1093/icb/9.2.429.
28. Cloney, R. A.; Brocco, S. L. Chromatophore Organs, Reflector Cells, Iridocytes and Leucophores in Cephalopods. *Am Zool* 1983, 23, 581-592, doi:10.1093/icb/23.3.581.
29. Williams, T. L.; Senft, S. L.; Yeo, J.; Martin-Martinez, F. J.; Kuzirian, A. M.; Martin, C. A.; DiBona, C. W.; Chen, C.-T.; Dinneen, S. R.; Nguyen, H. T.; et al. Dynamic Pigmentary and Structural Coloration within Cephalopod Chromatophore Organs. *Nat Commun* 2019, 10, 1004, doi:10.1038/s41467-019-08891-x.
30. Giordano, G.; Carlotti, M.; Mazzolai, B. A Perspective on Cephalopods Mimicry and Bioinspired Technologies toward Proprioceptive Autonomous Soft Robots. *Advanced Materials Technologies n/a,* 2100437, doi:10.1002/admt.202100437.
31. Zeng, S.; Zhang, D.; Huang, W.; Wang, Z.; Freire, S. G.; Yu, X.; Smith, A. T.; Huang, E. Y.; Nguon, H.; Sun, L. Bio-Inspired Sensitive and Reversible Mechanochromisms via Strain-Dependent Cracks and Folds. *Nat Commun* 2016, 7, 11802, doi:10.1038/ncomms11802.
32. Rossiter, J.; Yap, B.; Conn, A. Biomimetic Chromatophores for Camouflage and Soft Active Surfaces. *Bioinspir. Biomim.* 2012, 7, 036009, doi:10.1088/1748-3182/7/3/036009.
33. Beer, F. P.; Johnston, E. R.; DeWolf, J. T.; Mazurek, D. F. Mechanics of Materials. New York 1992.
34. Timoshenko, S. *History of Strength of Materials: With a Brief Account of the History of Theory of Elasticity and Theory of Structures;* Courier Corporation, 1983;
35. Young, W. C.; Budynas, R. G.; Sadegh, A. M. *Roark's Formulas for Stress and Strain;* McGraw-Hill Education, 2012;
36. Boresi, A. P.; Schmidt, R. J.; Sidebottom, O. M. *Advanced Mechanics of Materials;* Wiley New York, 1985; Vol. 6.
37. Aziz, M. S.; El sherif, A. Y. Biomimicry as an Approach for Bio-Inspired Structure with the Aid of Computation. *Alexandria Engineering Journal* 2016, 55, 707-714, doi:10.1016/j.aej.2015.10.015.
38. Soter, G.; Garrad, M.; Conn, A. T.; Hauser, H.; Rossiter, J. Skinflow: A Soft Robotic Skin Based on Fluidic Transmission. In Proceedings of the 2019 2nd IEEE International Conference on Soft Robotics (RoboSoft); IEEE: Seoul, Korea (South), April 2019; pp. 355-360.
39. Lin, K.-Y.; Gupta, S. K. Soft Fingers with Controllable Compliance to Enable Realization of Low Cost Grippers. In Proceedings of the Biomimetic and Biohybrid Systems; Mangan, M., Cutkosky, M., Mura, A., Verschure, P. F. M. J., Prescott, T., Lepora, N., Eds.; Springer International Publishing: Cham, 2017; pp. 544-550.
40. OpenCV: Canny Edge Detection Available online: https://docs.opencv.org/3.4/da/d22/tutorial_py_canny.html (accessed on 16 Nov. 2021).
41. Lee, S. Lines Detection with Hough Transform Available online: https://towardsdatascience.com/lines-detection-with-hough-transform-84020b3b1549 (accessed on 16 Nov. 2021).

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A sensor system, comprising:

a material;

a plurality of sensors attached to the material, each of the sensors comprising a chamber containing a marker;

a digital imager positioned for capturing a series of digital images of the markers as a function of time;

an image processor for image processing the one or more digital images to:

detect one or more changes in the marker resulting from one or more motions of the chamber in response to one or more forces applied to the material, compare relative motion between the marker in different ones of the sensors to differentiate between displacement modes comprising a bending mode, an elongation mode, and a twist mode, and from the changes or the relative motion, detect a pressure or the one or more displacement modes of the material in response to the one or more forces;

a display assembly comprising a window forming a boundary around each of the markers, the boundary delimiting an extent of an image frame for each of the series of images being processed by the image processing, wherein, for each image frame, the image processing:

obtains the image comprising image data;

crops the image frame to include only a portion of the image within the boundary;

converts the image data to gray scale to accentuate differences in light and dark colors and to eliminate possible noise from reflection, scales up every pixel value within the image frame to further accentuate a difference between a white background behind the marker;

detects a line edge of each of the markers using an edge detector algorithm; and returns at least one end point pixel of each of the line edges using a probability algorithm;

uses the end point pixel of each of the line edges to calculate the one or more changes comprising a displacement of the marker between successive ones of the image frames.

2. The sensor system of claim 1, wherein:

the chamber comprises a channel containing a cable or fluid capable of moving along the channel in response to the one or more motions, and the marker comprises a colored portion of the cable or the fluid.

3. The sensor system of claim 2, wherein the changes consist essentially of a linear displacement of the colored portion along or parallel to a coordinate axis.

4. The sensor system of claim 3, further comprising the display assembly guiding movement of the markers along the coordinate axis in a two dimensional plane imaged by the digital imager to form the images.

5. The sensor system of claim 1, wherein the chamber contains the marker comprising a fluid and the changes consist essentially of a size of the marker in response to the motions comprising an expansion or contraction of the chamber.

6. The sensor system of claim 1, further comprising the display assembly comprising the markers, wherein the display assembly is outside a region of the material deforming in response to the one or more forces, such that the image processor tracks the changes even when the region is outside a field of view of the digital imager.

7. The sensor system of claim 1, further comprising a display assembly comprising the markers and a lighting system, wherein the lighting system controls lighting conditions for the capturing of the images so as to enhance identification of the markers in the images during the image processing.

8. The sensor system of claim 1, further comprising:

a computer comprising one or more processors including the image processor; one or more memories; and one or more programs stored in the one or more memories, wherein the one or more programs executed by the one or more image processors execute the image processing using a machine vision algorithm or machine learning.

9. The sensor system of claim 1, wherein:

the marker comprises a colored cable inserted in the chamber comprising a casing, wherein the casing is attached to the material so that the cable is free to slide inside the casing in response to the displacement modes changing a shape of the casing, or the chamber comprises a microfluidic channel comprising a colored fluid comprising the marker and the digital imager records displacement of the colored fluid in response to the one or more forces or the pressure.

10. The sensor system of claim 1, wherein the chamber comprises a channel comprising a compressible sensing part connected to a flexible incompressible transmission part passing through the display assembly, so that when the force is applied to the sensing part through the material, the channel is compressed, reducing a volume of the sensing part and forcing the marker into the transmission part in the display assembly.

11. The sensor system of claim 1, wherein the chamber is embedded in or mounted on a surface of the material.

12. The sensor system of claim 1, further comprising a tool comprising the material, wherein the image processor:

detects, from the changes, the pressure or the one or more displacement modes of the component in response to the one or more forces, and outputs a measure of the one or more displacement modes as proprioceptive feedback to a robotic system controlling the tool.

13. A sensor system comprising:

a finger comprising a material;

a network or array of sensors attached to the material, each of the sensors comprising a chamber containing a marker, and the chambers each comprising a channel comprising a first end and a second end;

a digital imager positioned for capturing a series of digital images of the markers as a function of time;

an image processor for image processing the one or more digital images to:

associate each of the markers with locations of the first ends in the material;

determines the linear displacements of each of the markers; and compare the linear displacements of each of the markers, taking into account the locations of the first ends associated with the each of the markers, so as to detect displacement mode, assigning each of a plurality of arrangements of the markers, or arrangements of changes in the markers, to a different one of the displacement modes or combination of the displacement modes; wherein:

the first ends are distributed in three dimensions throughout a volume of the material deforming in response to forces, and the second ends containing the markers arranged in a two dimensional plane imaged in the one or more images by the digital imager;

the sensors comprise fibers, cables, or fluid moving in the channels, the first ends are distributed in an array, and the markers are configured in a display assembly, so that for the displacement mode comprising, a bending mode having a center of curvature, a first set of the markers, attached to the first ends in a first row of array closest to the center of curvature, have the linear displacement in an opposite direction in the one or more images, as compared to a second set of the markers attached to the second ends in a second row of the array furthest from the center of curvature;

an elongation mode, all the markers have the linear displacement in the same direction in the one or more images; and a twist mode about a central twist axis, a third set of the markers, attached to the first ends at corners of the array furthest from the twist axis, have the linear displacement that is larger in the one or more images as compared to a fourth set of the markers attached to the first ends closer to the twist axis;

and the sensors further comprise the network or array of the sensors arranged so that the relative motion of the markers differentiates between the displacement modes.

14. The sensor system of claim 13, comprising a single camera or single array of the digital imager capturing the images each comprising all of the markers.

15. The sensor system of claim 14, comprising between 5 and 100 of the sensors.

16. A method of controlling a tool, comprising:

capturing, using a single digital camera, one or more digital images of one or more changes of a plurality of sensors in response to application of one or more forces to the one or more sensors attached to a tool, wherein the changes are displayed by motion of markers in a display assembly, each of the markers attached to a different one of the sensors, the sensors comprising fibers, cables, or fluid moving in channels, the channels having first ends distributed in an array and second ends, and the markers configured in the display assembly;

computing a measurement of the response from the changes captured in the one or more images, the measurement capable of identifying a pressure and the response comprising a bending mode, an elongation mode, and a twist mode; and controlling the tool using the measurement as proprioceptive feedback;

wherein each of the sensors comprises a chamber containing the cable or fluid capable of moving along the chamber, or deforming the chamber, in response to the one or more forces, and the markers comprise colored portions of the cables or the fluid; and wherein:

the computing comprises:

determining one or more linear displacements of each of the markers; and comparing the linear displacements of each of the markers, taking into account the locations of first ends associated with the each of the markers, so as to detect a displacement mode; and for the displacement mode comprising:

the bending mode having a center of curvature, a first set of the markers, attached to the first ends in a first row of array closest to the center of curvature, have the one or more linear displacements in an opposite direction in the one or more images, as compared to a second set of the markers attached to the second ends in a second row of the array furthest from the center of curvature;

the elongation mode, all the markers have the one or more linear displacements in the same direction in the one or more images; and the twist mode about a central twist axis, a third set of the markers, attached to the first ends at corners of the array furthest from the twist axis, have the one or more linear displacements that is larger in the one or more images as compared to a fourth set of the markers attached to the first ends closer to the twist axis.

17. A system, comprising:

a plurality of fluidic sensors attached to a tool, each of the fluidic sensors comprising a marker and a channel having a first end and a second end;

a camera for capturing one or more images of the markers; and a computer coupled to the camera; the computer processing the images to:

compute a measurement of a response of markers to one or more forces applied to the tool in each of the fluidic sensors, the measurement capable of identifying the forces comprising a pressure and displacement modes of the tool comprising a bending mode, an elongation mode, and a twist mode by comparing one or more linear displacements of the markers; and controlling the tool using the measurement as proprioceptive feedback; wherein:

for the displacement mode comprising:

the bending mode having a center of curvature, a first set of the markers, attached to the first ends in a first row of an array closest to the center of curvature, have the one or more linear displacements in an opposite direction in the one or more images, as compared to a second set of the markers attached to the second ends in a second row of the array furthest from the center of curvature;

the elongation mode, all the markers have the one or more linear displacements in the same direction in the one or more images; and the twist mode about a central twist axis, a third set of the markers, attached to the first ends at corners of the array furthest from the twist axis, have the one or more linear displacements that are larger in the one or more images as compared to a fourth set of the markers attached to the first ends closer to the twist axis.

* * * * *